United States Patent [19]

Rhodes

[11] Patent Number: 5,784,113
[45] Date of Patent: Jul. 21, 1998

[54] UNIDIRECTIONAL FORMAT CONVERTER

[75] Inventor: Charles W. Rhodes, Edgewater, Md.

[73] Assignee: Advanced Television Test Center, Alexandria, Va.

[21] Appl. No.: 480,925

[22] Filed: Jun. 7, 1995

Related U.S. Application Data

[60] Continuation of Ser. No. 156,833, Nov. 24, 1993, Pat. No. 5,442,460, which is a division of Ser. No. 404,190, Sep. 7, 1989, Pat. No. 5,280,397.

[51] Int. Cl.$^6$ .................................................. H04N 7/01
[52] U.S. Cl. ......................... 348/441; 358/335; 348/716
[58] Field of Search ................................. 348/441, 443, 348/445, 716; 358/335; H04N 7/01

[56] References Cited

U.S. PATENT DOCUMENTS

| | | | |
|---|---|---|---|
| 3,983,328 | 9/1976 | Newell | 178/6.8 |
| 4,276,565 | 6/1981 | Dalton et al. | |
| 4,283,736 | 8/1981 | Morio et al. | |
| 4,306,249 | 12/1981 | Croll | |
| 4,463,387 | 7/1984 | Hashimoto et al. | |
| 4,468,708 | 8/1984 | Coleman, Jr. | 358/310 |
| 4,500,930 | 2/1985 | Hamaiainen et al. | |
| 4,520,401 | 5/1985 | Takahashi et al. | |
| 4,530,048 | 7/1985 | Proper | |
| 4,533,958 | 8/1985 | Herget | 358/280 |
| 4,549,224 | 10/1985 | Nakamura et al. | |
| 4,577,240 | 3/1986 | Hedberg et al. | |
| 4,587,556 | 5/1986 | Collins | |
| 4,597,020 | 6/1986 | Wilkenson | |
| 4,638,380 | 1/1987 | Wilkinson et al. | |
| 4,651,208 | 3/1987 | Rhodes et al. | |
| 4,658,284 | 4/1987 | Kawamura et al. | |
| 4,661,862 | 4/1987 | Thompson | |
| 4,730,222 | 3/1988 | Schauffele | |
| 4,743,958 | 5/1988 | Bannister et al. | |
| 4,757,390 | 7/1988 | Meghrgardt et al. | |
| 4,797,746 | 1/1989 | Ashcraft | |
| 4,812,906 | 3/1989 | Wolber | |
| 4,862,292 | 8/1989 | Enari | |
| 4,872,054 | 10/1989 | Gray et al. | 358/140 |
| 4,884,138 | 11/1989 | Storey | 358/133 |
| 4,905,084 | 2/1990 | Zucker | |
| 4,963,991 | 10/1990 | Honjo | |
| 4,984,094 | 1/1991 | Emori | |
| 5,001,562 | 3/1991 | Tabata et al. | 358/140 |
| 5,023,717 | 6/1991 | Lamnabhi et al. | 358/140 |
| 5,031,404 | 7/1991 | Flory | 60/547.1 |
| 5,047,865 | 9/1991 | Inoue | |
| 5,065,259 | 11/1991 | Kubota et al. | |
| 5,168,359 | 12/1992 | Mills | 348/441 |
| 5,200,749 | 4/1993 | Crosby et al. | |
| 5,239,381 | 8/1993 | Takahashi | |
| 5,327,235 | 7/1994 | Richards | 348/441 |

FOREIGN PATENT DOCUMENTS

| | | |
|---|---|---|
| 0 329 812 | 2/1988 | European Pat. Off. |
| 0 263 795 | 4/1988 | European Pat. Off. |
| 2 536 935 | 6/1984 | France |
| 3061858 | 11/1986 | Germany |
| 63-102594 | 5/1988 | Japan |
| 1-252091 | 10/1988 | Japan |
| 1412091 | 10/1975 | United Kingdom |

OTHER PUBLICATIONS

RCA Developments in Television Aug., 1937 p. 75.

*Primary Examiner*—Victor R. Kostak
*Attorney, Agent, or Firm*—Banner & Allegretti, Ltd.

[57] ABSTRACT

A television signal format converter is provided for converting without loss of picture information any high definition television format to or from a given recorder/player format. An interface converts between RGB and luminance/chrominance inputs and between analog and digital inputs. The interface couples any proposed high definition television format to a plurality of pairs of memories. A clock and control circuit controls addressing of the memories for reading and writing so that conversion is performed between any high definition television format and the format required for a given high definition digital video tape recorder or any other comparable recorder.

37 Claims, 24 Drawing Sheets

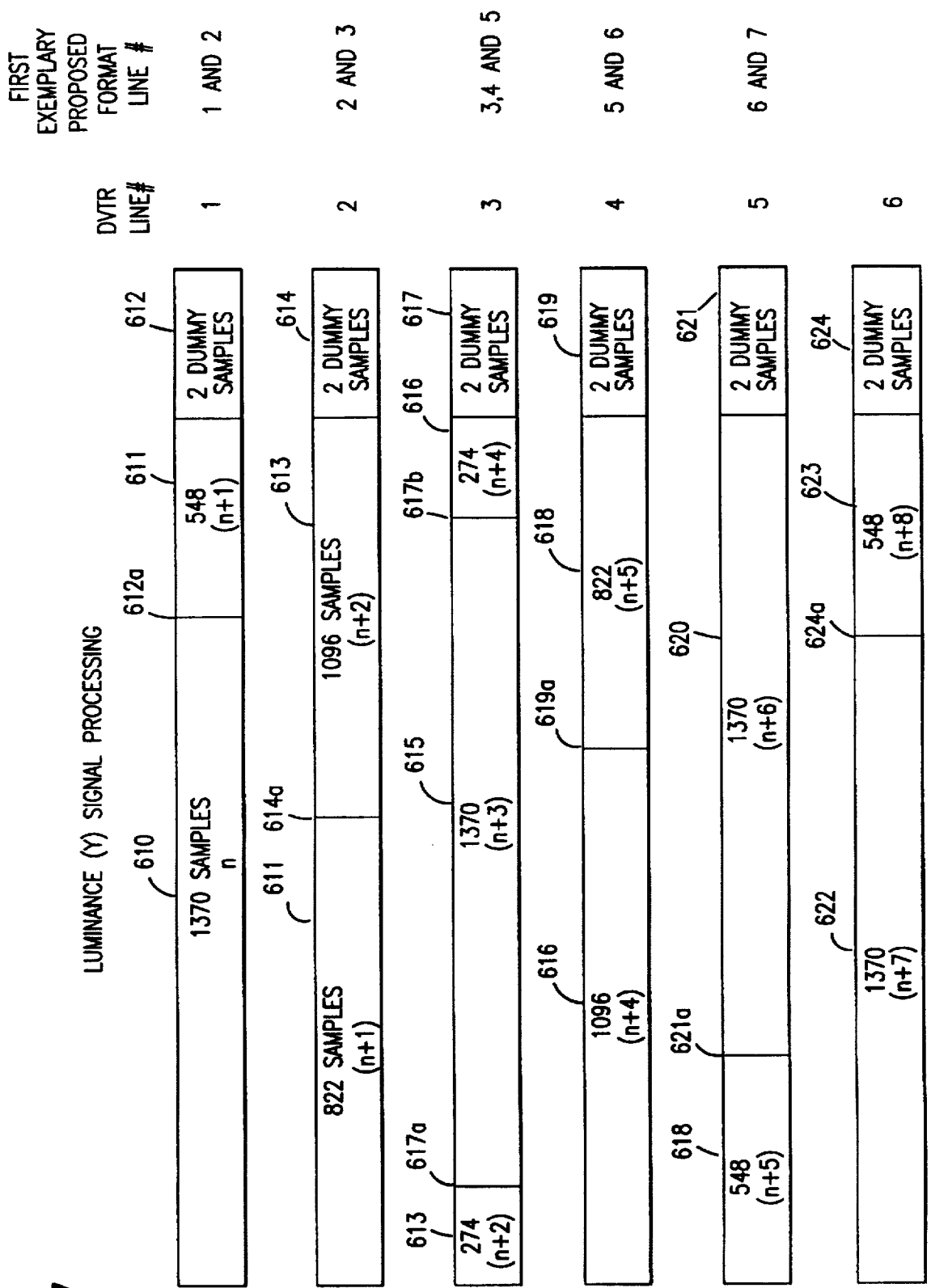

DIGITAL RECORDING SCHEME FOR SECOND EXEMPLARY PROPOSED FORMAT

- 34.5 BLOCKS OF 15 PACKETS = 517.5 PACKETS/FIELD
- 34.5 BLOCKS OF ACTIVE VIDEO LINES = 483 ACTIVE LINES/FIELD

DVTR LINE (PACKET)

| SOURCE LINE | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0000-1917 | 1918-2054 | | | | | | | | | | | | | |
| 2 | | 0000-1780 | 1781-2055 | | | | | | | | | | | | |
| 3 | | | 0000-1643 | 1644-2054 | | | | | | | | | | | |
| 4 | | | | 0000-1506 | 1507-2054 | | | | | | | | | | |
| 5 | | | | | 0000-1369 | 1370-2054 | | | | | | | | | |
| 6 | | | | | | 0000-1232 | 1233-2054 | | | | | | | | |
| 7 | | | | | | | 0000-1095 | 1096-2054 | | | | | | | |
| 8 | | | | | | | | 0000-0958 | 0959-2054 | | | | | | |
| 9 | | | | | | | | | 0000-0821 | 0822-2054 | | | | | |
| 10 | | | | | | | | | | 0000-0684 | 0685-2054 | | | | |
| 11 | | | | | | | | | | | 0000-0547 | 0548-2054 | | | |
| 12 | | | | | | | | | | | | 0000-0410 | 0411-2054 | | |
| 13 | | | | | | | | | | | | | 0000-0273 | 0274-2054 | |
| 14 | | | | | | | | | | | | | | 0000-0136 | 0137-2054 |

FIRST REPEAT

| PARAMETERS | SPECIFICATIONS |
|---|---|
| 1. CODED SIGNALS: Y, $P_B$, $P_R$ OR G, B, R | THESE SIGNALS ARE OBTAINED FROM GAMMA PRE-CORRECTED SIGNALS. |
| 2. NUMBER OF SAMPLES PER TOTAL LINE:<br>–G, B, R OR LUMINANCE SIGNAL<br>–EACH COLOR-DIFFERENCE SIGNAL ($P_B$, $P_R$) | Y   2200      G   2200<br>$P_B$  1100      B   2200<br>$P_R$  1100      R   2200 |
| 3. SAMPLING STRUCTURE | ORTHOGONAL LINE, FIELD AND FRAME REPETITIVE |
| –G, B, R OR LUMINANCE SIGNAL<br><br>–EACH COLOR-DIFFERENCE SIGNAL | THE G, B, R SAMPLING STRUCTURES TO BE COINCIDENT AND COINCIDENT ALSO WITH THE LUMINANCE SAMPLING STRUCTURE OF THE Y, $P_B$, $P_R$ SYSTEM.<br>$P_B$ AND $P_R$ SAMPLES COSITED WITH ODD (1ST, 3RD, 5TH, ETC.) Y SAMPLES IN EACH LINE. |
| 4. SAMPLING FREQUENCY:<br><br>–G, B, R OR LUMINANCE SIGNAL<br><br>–EACH COLOR-DIFFERENCE SIGNAL | Y   74.25 MHz      G   74.25 MHz<br>$P_B$  37.125 MHz     B   74.25 MHz<br>$P_R$  37.125 MHz     R   74.25 MHz<br>(1)<br>THE TOLERANCE FOR THE SAMPLING FREQUENCIES SHOULD COINCIDE WITH THE TOLERANCE FOR THE LINE FREQUENCY OF THE RELEVANT 1125/60 HDTV STANDARD |
| 5. FORM OF CODING | UNIFORMLY QUANTIZED PCM, AT LEAST 8 BITS PER SAMPLE. |
| 6. NUMBER OF SAMPLES PER DIGITAL AVTIVE LINE:<br>–G, B, R OR LUMINANCE SIGNAL<br>–EACH COLOR-DIFFERENCE | Y   1920      G   1920<br>$P_B$  960       B   1920<br>$P_R$  960       R   1920 |
| 7. ANALOG-TO-DIGITAL HORIZONTAL TIMING RELATIONSHIP:<br>–FROM END OF DIGITAL ACTIVE LINE TO THE HORIZONTAL SYNC TIMING REFERENCE | (2)<br>88 LUMINANCE CLOCK PERIODS |

FIG.15a

| | |
|---|---|
| 8. CORRESPONDENCE BETWEEN VIDEO SIGNAL LEVELS AND THE 8 MOST SIGNIFICANT BITS(MSB) OF THE QUANTIZATION LEVEL FOR EACH SAMPLE:<br>—SCALE<br>—G,B,R OR LUMINANCE SIGNAL<br><br><br><br>—EACH COLOR DIFFERENCE SIGNAL | 0 TO 255<br>220 QUANTIZATION LEVELS WITH THE BLACK LEVEL CORRESPONDING TO LEVEL 16 AND THE PEAK WHITE LEVEL CORRESPONDING TO LEVEL 235.<br><br>THE SIGNAL LEVEL MAY OCCASIONALLY EXCURSE BEYOND LEVEL 235<br>225 QUANTIZATION LEVELS IN THE CENTER PART OF THE QUANTIZATION SCALE WITH ZERO SIGNAL CORRESPONDING TO LEVEL 128<br>THE SIGNAL LEVEL MAY OCCASIONALLY EXCURSE BEYOND LEVEL 16 AND 240. |
| 9. CODE-WORD USAGE FOR THE 8 MOST SIGNIFICANT BITS (MSB) | CODE-WORDS CORRESPONDING TO QUANTIZATION LEVELS 0 AND 255 ARE EXCLUSIVELY FOR SYNCHRONIZATION. LEVELS 1 TO 254 ARE AVAILABLE FOR VIDEO. |

FIG.15b

SPECIFICATIONS

GENERAL
TAPE TYPE: 1 INCH METAL PARTICLE TAPE
RECORDING/ 63 MIN. (11.76' TOOL)
 PLAYBACK TIME: 96 MIN. (14.0' TOOL)
POWER REQUIREMENTS: AC 100V/117V:10%
 50/60 Hz

POWER CONSUMPTION
 TAPE TRANSPORT UNIT: 950 W APPROX.
 SIGNAL PROCESSOR UNIT: 1300 W APPROX.
DIMENSIONS (WxHxD):
 TAPE TRANSPORT UNIT: 480 = 844 X 745 MM
 (18-7/8 X 33-1/4 X 29-5/16 IN)

SIGNAL PROCESSOR UNIT: 480 = 730 X 615MM
 (18-7/8 X 26-3/4 X 24-3/16 IN)

WEIGHT:
 TAPE TRANSPORT UNIT: 120 KG APPROX. (265 LBS.)
 SIGNAL PROCESSOR UNIT: 110 KG APPROX. (243 LBS.)
AMBIENT TEMPERATURE: 15° - 35°C

VIDEO SAMPLING FREQUENCY
 Y: 74.25 MHz
 $P_B/P_R$: 37.125 MHz
QUANTIZATION: 8 BITS/SAMPLE
FREQUENCY BANDWIDTH:
 Y: 30 MHz ± 1.5 dB
 $P_B/P_R$: 15 MHz ± 1.5 dB
S/N: 56dB
K FACTOR: LESS THAN 1(2T PULSE)
DIGITAL AUDIO (CH1-CH2)
SAMPLING FREQUENCY: 48 KHz
QUANTIZATION: 16 BITS/SAMPLE
FREQUENCY BANDWIDTH: 20 Hz - 20 KHz $^{+0.5dB}_{-1.0dB}$
DYNAMIC RANGE: GREATER THAN 90dB
CROSSTALK: LESS THAN - 80dB
 (1KHz BETWEEN CHANNELS)

EMPHASIS:
 T1: 50 μS (ON/OFF PERMITTED)
 T2: 15 μS (ON/OFF PERMITTED)
ANAGLOG AUDIO (CUE TRACK)
FREQUENCY RESPONSE: 100 Hz - 12 KHz ± 3dB
S/N: 42dB
 (3% DISTORTION LEVEL)
DISTORTION LESS THAN 3%
 (1 KHz, OPERATING LEVEL)

FIG.15c

INPUT/OUTPUT SIGNALS
1. VIDEO INPUT
   (1) ANALOG SIGNAL:    R,G,B/Y,$P_B$/$P_R$ SWITCHABLE
       1.0 Vp-p 75 OHMS 1 CIRCUIT
       (VIDEO 0.7 Vp-p, SYNC ± 0.3 Vp-p)

(2) DIGITAL SIGNAL:
      Y:    8-BIT PARALLEL (74.25 MHz)
      $P_B$/$P_A$    MULTIPLEX 8-BIT PARALLEL
       (74.25 MHz)
      CLOCK:    74.25 MHz

2. AUDIO INPUT
   (1) ANALOG SIGNAL (LINE):    + 4dBm 600 OHMS/
       100K OHMS SWITCHABLE
       BALANCED 8 CIRCUITS
   (2) ANALOG SIGNAL (CUE):    + 4dBm 600 OHMS/
       BALANCED 1 CIRCUIT
   (3) DIGITAL SIGNAL (CCIR RECOMMENDATION 647)
       XLR x 4/D-SUB x 1
       SWITCHABLE

3. SYNC INPUT:
   TRI-LEVEL BIPOLAR PULSE SYNC SIGNAL:
       ± 0.3 Vp-p 75 OHMS
       1 CIRCUIT

4. SMPTE TIME CODE INPUT:    2.4 Vp-p 600 OHMS
       1 CIRCUIT

5. VIDEO OUTPUT
   (1) ANALOG SIGNAL:    R,G,B/Y,$P_B$,$P_R$
       SWITCHABLE
       1.0 Vp-p 75 OHMS
       2 CIRCUITS
       SWITCHABLE
       (VIDEO 0.7 Vp-p,
       SYNC ± 0.3 Vp-p)

(2) DIGITAL SIGNAL
      Y:    8-BIT PARLLEL
       (74.25 MHz)
      $P_B$/$P_R$    MULTIPLEX 8-BIT PARALLEL
       (74.25 MHz)
      CLOCK:    74.25 MHz

FIG. 15d

6. AUDIO OUTPUT
   (1) ANALOG SIGNAL(LINE):   + 4dBm LOW IMPEDANCE
                              BALANCED 8 CIRCUITS
   (2) ANALOG SIGNAL(CUE):    + 4dBm LOW IMPEDANCE
                              BALANCED 1 CIRCUIT
   (3) DIGITAL SIGNAL(CCIR RECOMMENDATION 547)
                              XLR x 4/D-SUB x 1
                              SWITCHABLE

7. SYNC OUTPUT
   TRI-LEVEL BIPOLAR PULSE SYNC SIGNAL:
                              ± 0.3 Vp-p 75 OHMS
                              2 CIRCUITS

8. SMPTE TIME CODE
   OUTPUT:                    2.4 Vp-p LOW IMPEDANCE
                              600 OHMS BALANCED
                              1 CIRCUIT

9. MONITOR OUTPUT
   (1) WAVEFORM MONITOR
       OUTPUT SIGNAL          1.0 Vp-p 75 OHMS
                              1 CIRCUIT
   (2) VIDEO MONITOR
       OUTPUT SIGNAL          1.0 Vp-p 75 OHMS
                              1 CIRCUIT
   (3) MONITOR SYNC OUTPUT
       SIGNAL(TRI-LEVEL):     ± 0.3 Vp-p 75 OHMS
                              2 CIRCUITS
   (4) AUDIO MAIN SIGNAL MONITOR OUTPUT (R)/(L):
       (CHOSEN FROM DA1 - DA8 & CUE)
                              + 4dBm LOW IMPEDANCE
                              BALANCED 1 CIRCUIT

10. SYNC OUTPUT (525/60):     0.3 Vp-p 75 OHMS
                              1 CIRCUIT

FIG.15e

UNIDIRECTIONAL FORMAT CONVERTER

This application is a continuation of U.S. application Ser. No. 08/156,833 filed Nov. 24, 1993, now U.S. Pat; No. 5,442,460, which is a divisional of U.S. application Ser. No. 07/404,190 filed Sep. 7, 1989, now U.S. Pat. No. 5,280,397.

BACKGROUND OF THE INVENTION

1. Technical Field

This invention relates to high definition television and, more particularly, relates to a method and apparatus for converting without loss of picture information any high definition television format to and from a given recorder/player format.

2. Related Information

Prior to the introduction in the United States and Japan of the existing NTSC standard television signal format and the introduction in Europe of the PAL and SECAM formats, there was considerable discussion over which broadcast black and white format to choose. Some broadcast formats were desirable because they exhibited less RF interference when transmitted. Other broadcast formats were desirable because they delivered a television picture having a sharper or less choppy image. Discussion again occurred, upon the introduction of color television, over which color signal broadcast format to choose and whether the chosen color format should be compatible with the broadcast black and white television format. In the United States today, the same issues are again being raised over the choice of a second generation television format—commonly known as high definition television (HDTV) or advanced television (ATV). Recent issues include discussion concerning which format is best suited for conventional over-the-air broadcast as well as best suited for transmission over new mediums such as fiber optic cable, coaxial cable, telephonic, broadcast satellite, and pre-recorded mediums. The recent issues include discussion of whether the new HDTV format should be compatible with the present NTSC format. While the Federal Communications Commission of the United States would like the new format to be NTSC compatible, there is considerable influence world-wide to adopt a totally new standard. The discussion further includes the issue of whether a proposed format will be adversely affected during broadcast or transmission on the new mediums and whether such a proposed format will subjectively provide an adequate picture. Many formats have been proposed for adoption by proponents both inside and outside the United States.

The Advanced Television Test Center was established in Alexandria, Va., as a neutral test center for evaluation and comparison of proposed HDTV formats. Besides testing the proposed HDTV formats for immunity to electrical interference and other impairments and testing for NTSC compatibility, the proposed HDTV formats are shown to viewers for subjective evaluation. Viewers compare, by psycho-physical testing, the proposed HDTV formats and rate them as to their characteristics with and without transmission impairments. In order to perform testing on all proposed formats, the television test center has a need for a uniform video tape recorder which can record all proposed formats.

Such a uniform video source may be provided by a video tape recorder capable of recording any one of all proposed HDTV formats and playing back in the recorded HDTV format. Several digital video tape recorders (DVTR), the Sony HDD-1000 and the Hitachi DVTR, are capable of recording or playing back a HDTV signal. Either the Sony or the Hitachi video tape recorder is capable of recording 1920 bytes of luminance data at 74.25 megabytes per second and two chrominance data components comprising another 1920 bytes per line at 74.25 megabytes per second as packets of data. Digital data packets are recorded at a rate of 517.5 lines per field with 2 fields per frame. The HDD-1000 has a field rate of 60 Hz at which 74.25 megabytes per second are recorded as mentioned above. The HDD-1000 can also be used at a field rate of 59.94 Hz at which 74.175 megabytes per second are recorded. The field rate of 59.94 Hz is actually 60×(1000/1001) Hz. While a DVTR is capable of recording and playing back in accordance with the above-described input/output specifications, a requirement remains to provide an interface for such a recorder allowing other proposed formats to be recorded uniformly without the introduction of losses.

Prior systems have been proposed for recording at least one format on a single video tape recorder. For example, U.S. Pat. No. 4,549,224, issued to Nakamura et al., provides an apparatus for recognizing either an NTSC or a PAL/SECAM format and generating an appropriate recording frequency dependent on the recognized format. The Nakamura system is incapable of recording proposed high definition television formats. Furthermore, the Nakamura system does not perform signal conversion for recording or playback in a desired format.

Systems are also known for providing conversion between television formats. These systems, however, are incapable of converting television formats without loss or alteration of picture quality. At the Advanced Television Test Center, conversion between formats must occur without alteration of picture quality or loss of information content. All known conversion systems use interpolation techniques and approximation algorithms for this type of conversion. For instance, U.S. Pa. No. 4,587,556, issued to Collins, discloses a television standard converter for converting conventional PAL and NTSC signals using weighing factors and interpolation. Furthermore, U.S. Pat. No. 4,276,565, issued to Dalton et al., converts conventional television formats using interpolation. U.S. Pat. No. 4,658,284, issued to Kawamura et al., is capable of downsizing a 625 line PAL format to a 525 line format for printing on a color printer. Interpolation is used for the downsizing conversion. Conversion between conventional formats is also performed in U.S. Pat. No. 4,661,862 issued to Thompson, wherein data reduction is performed by deletion and in U.S. Pat. No. 4,283,736, issued to Morio et al., wherein conversion by discarding or repeating information signals is performed. Such schemes entail loss in picture quality or content. Interpolation itself is a filtering function. Some information must be lost and therefore such schemes cannot be truly bi-directional.

Other systems such as that disclosed in U.S. Pat. No. 4,743,958, issued to Bannister et al., convert conventional encoded NTSC, PAL, SECAM and analog RGB, YUV to separate chrominance and luminance signals for input to a special effects device. Bannister et al. performs the conversion using filters for processing the signals. U.S. Pat. No. 4,463,387, issued to Hashimoto et al., processes video data both before recording and after playback for quality improvement. No conversion is performed.

Systems for adapting an input to a VCR include U.S. No. 4,597,020, issued to Wilkinson, wherein a video signal is shuffled before recording and unshuffled upon playback to avoid drop out in the event of head failure. U.S. Pat. No. 4,530,048, issued to Proper, adapts a VCR for computer memory backup storage. Proper concerns interfacing a VCR to avoid VCR information dropouts, a problem of no concern for digital video recording. U.S. Pat. No. 4,638,380, issued to Wilkinson et al., discloses a multiple head video tape recorder with switching and interpolation to remove the effects of a failed head.

U.S. Pat. No. 4,651,208 was issued to Charles Rhodes, the inventor of the present application, and was assigned to an assignee other than the assignee of the present application. The patent discloses conversion between widescreen and non-widescreen television transmissions using input/output multiplexers for line conversion in line memory pairs. Picture lines are clocked into and out of a memory to change the width of a picture.

None of the above systems provide a uniform video source for equally comparing proposed high definition television formats. Known interpolators and filters unfortunately reproduce and convert high definition television signals with the sacrifice of picture information.

SUMMARY OF THE INVENTION

An important object of the present invention is to provide a recorder for recording any HDTV format without loss of picture information.

Another object of the present invention is to provide a player for playing any HDTV format without loss of picture information.

Another object of the present invention is to provide a recorder/player for playing back any HDTV format without loss of picture information.

Another object of the present invention is to provide a converter for converting any HDTV format to digital luminance and chrominance data signals for recording on a digital video recorder without loss of picture information.

Another object of the present invention is to provide a conversion circuit for playback of digital luminance and chrominance signals in any desired HDTV format without loss of picture information.

A further object of the present invention is to provide a converter for allowing a commercially available DVTR to record and playback any HDTV format.

The present invention solves the above-mentioned problems by providing a converter for converting without loss of picture information any high definition television format to and from a given recorder/player format. The format converter of the present invention provides an interface for converting between RGB and luminance/chrominance inputs and between analog and digital inputs. The interface couples any proposed high definition television format to a plurality of memory pairs. A clock and control circuit controls addressing of the memories for reading and writing so that conversion is performed between any high definition television format and the format required for the Sony HDD-1000 or Hitachi digital video tape recorder or any other comparable recorder.

In particular, during a record mode of operation, involving both a converter according to the present invention and a digital video tape recorder, the converter operates as a slave to horizontal and vertical drive synchronizing signals provided by the source of a particular format. The particular format's video signal is digitized and stored in the memory at one rate and read out of the memory at the rate of operation of the DVTR. An advantage of the present invention is that the size of the memory may be simultaneously limited and the clocking and controlling of the converter memory facilitated without any loss in the proponent's signal regardless of the input signal format. Furthermore, the reading of converter memory and writing of data into the DVTR are controlled and synchronized by the control signals provided by the source of the proponent's format.

During a playback mode of operation, the converter according to the present invention becomes the source of controlling the DVTR and the output to the broadcaster. Nevertheless, the same limited size memory may be employed with the same advantages as during the record mode.

In the event one of the proposed HDTV formats other than those formats based upon the format for which commercially available recorders are designed is adopted by the Federal Communications Commission in the United States, broadcasters will be able to employ the present invention with presently available commercial DVTRs (such as the Sony HDD-1000 or Hitachi DVTR) to record and playback HDTV pictures and audio—not having to await development of a new HDTV DVTR specifically constructed for the adopted format—an uncertain delay and possibly greater realized cost.

These and other objects and features of the present invention will become evident from the following detailed description of the invention when read in conjunction with the appended drawings.

BRIEF DESCRIPTION OF THE DRAWINGS

FIG. 7 illustrates seven lines of a first exemplary proposed HDTV format included in five lines of a digital luminance signal for recording on the recorder.

FIG. 9 illustrates how samples of lines of fields of a first exemplary proposed HDTV format are placed in the lines of fields of the digital video recorder.

FIG. 10 illustrates how samples of the lines of fields of a second exemplary proposed HDTV format are placed in the lines of fields of the HDTV recorder.

FIGS. 15(a) and (b) together comprise a table illustrating important specifications for the Sony HDD-1000 digital video tape recorder.

FIGS. 15(c) to (e) together comprise a table illustrating important specifications for the Hitachi digital video tape recorder.

DETAILED DESCRIPTION OF THE INVENTION

Figure 1:
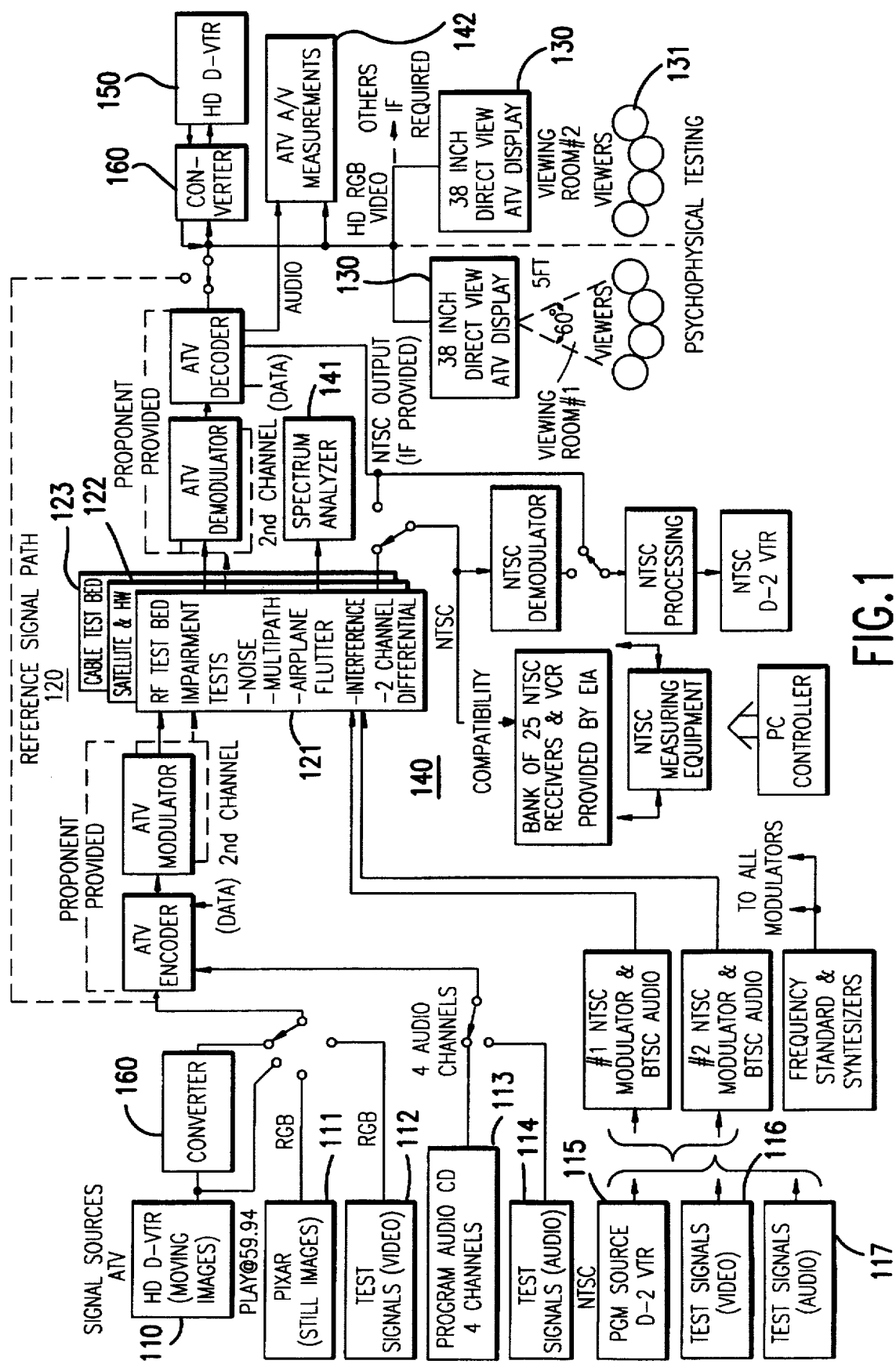
FIG. 1 is a block schematic diagram of a television test center for testing and comparing proposed HDTV formats.

FIG. 1 illustrates a television test center utilizing the multiple HDTV format/recorder players 110 and 150, including converter 160 of the present invention. Signal sources for proposed high-definition television are provided by high-definition digital video tape recorder (DVTR) 110, PIXAR 111 and test signal block 112. Signal sources for test audio are provided by program audio block 113 and test signal audio block 114. Signal sources for the conventional NTSC format are provided by program source block 115, video test signal block 116 and audio test signal block 117. The outputs of the signal sources are directed to test bed 120, including RF test bed 121, satellite and microwave test bed 122 and cable test bed 123. At test bed 120, the television signals are subjected to impairments including noise conditions, multipath, airplane flutter, two channel signal level and time differentials and interference. An impaired television signal is then sent from test bed 120 to displays 130 for psycho-physical testing by viewers 131. An actual or impaired signal output from test bed 120 is also sent to processing equipment 140 for NTSC compatibility tests. The actual or impaired signal output from the test bed can be recorded on high definition television digital video tape recorder (DVTR) 150. Measurement of the HDTV signal can also be made by spectrum analyzer 141 and advanced television audio and visual measurement equipment 142. Digital video tape recorder 150 can also playback directly to high definition television displays 130 for psycho-physical testing.

The present invention provides converters 160 used in conjunction with high definition digital video tape recorders (DVTR) 110 and 150. DVTR 110 plays and DVTR 150 records in only one advanced television format. DVTR 110 is preferably a Sony HDD-1000 or Hitachi digital recorder/player having predetermined input/output specifications substantially in accordance with Japanese high definition broadcast standards; however, the principles of the present invention may be likewise applied to other digital signal recorders having other input/output specifications. Important specifications for the Sony HDD-1000 are illustrated in FIG. 15(a). Important specifications for the Hitachi DVTR are illustrated in FIG. 15(b).

Converter 160, according to the present invention, converts any advanced television or high definition television signal for recording or playback on DVTRs 110 and 150. Converter 160 will be discussed in conjunction with FIGS. 2 and 3 followed by a detailed discussion in conjunction with FIGS. 4–10.

Figure 2:
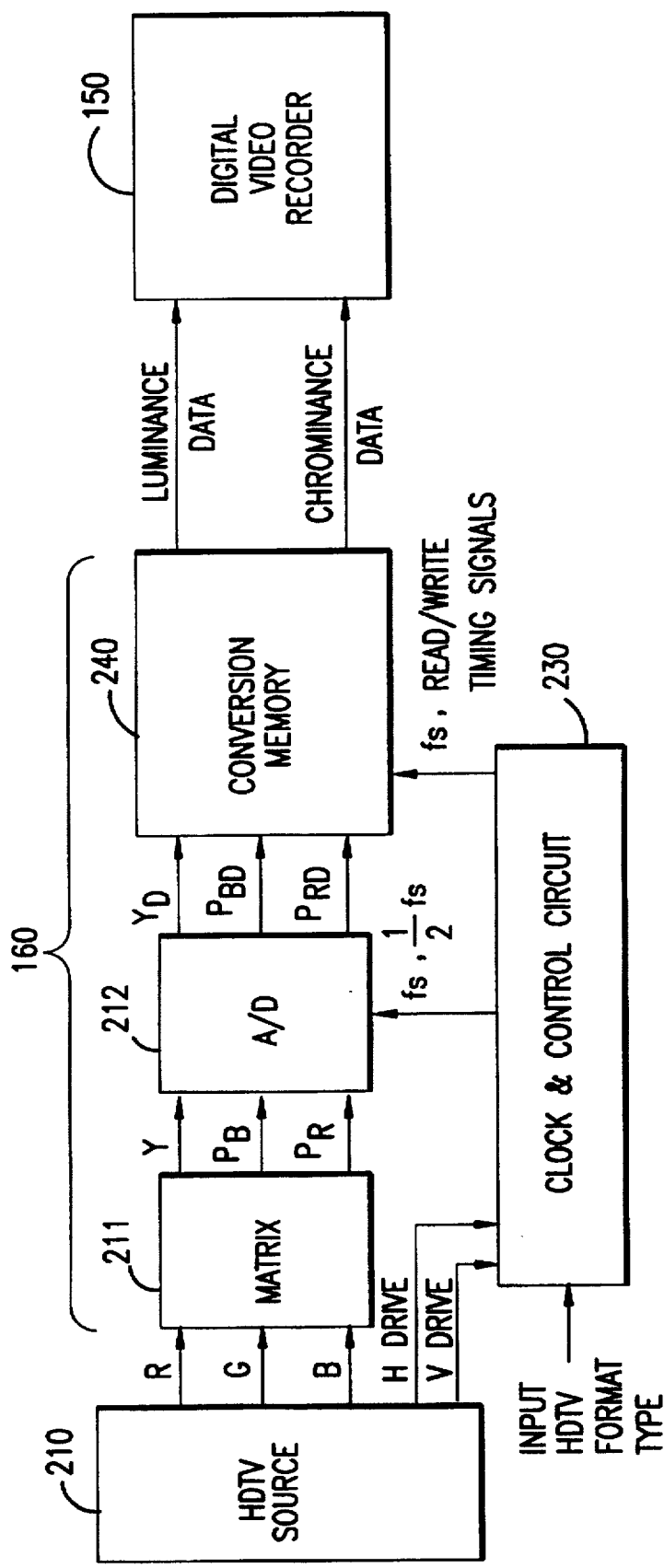
FIG. 2 is a block schematic diagram of components for recording any HDTV format on a given digital video recorder.

FIG. 2 illustrates converter 160 adapted for recording any HDTV format from HDTV source 210 on digital video recorder 150. HDTV source 210 can be a high definition television camera or other known source such as a specialized high definition television video player. Preferably, RGB (red, green, blue) signals, a FORMAT V-DRIVE IN (vertical) synchronization signal and a FORMAT H-DRIVE IN (horizontal) synchronization signal are provided by HDTV source 210 (FIG. 6(a)). Matrix 211 converts the RGB signals to luminance signal Y and chrominance color difference signals R-Y and B-Y. Matrix 211 is preferably constructed using resistors that combine the RGB signal according to the following equation:

$$Y = 0.3\,R + 0.59\,G + 0.11\,B$$

The chrominance signals are found as R-Y and B-Y using resistors and phase inverters. Other chrominance signals can alternatively be converted such as I and Q associated with the video signal. Clock and control circuit 230 clocks analog to digital converter 212 at a frequency $f_s$ and ½ $f_s$ where $f_s$ is the sampling clock frequency. The luminance signal is digitized at the sampling frequency $f_s$ and the chrominance signals are digitized at the sampling frequency ½ $f_s$. Because the two chrominance signals will later be combined into a single chrominance signal, the chrominance signals are digitized at half the rate of the luminance signal.

It is conceivable that HDTV source 210 could provide signals in either analog or digital, RGB, or chrominance and luminance components. Thus, depending upon the particular output of the HDTV source, matrix 211 and analog to digital converter 212 may not be required.

Clock and control circuit 230 also provides control signals to conversion memory 240. Data indicating the high definition television format input by HDTV source 210 for recording on digital video recorder 150 is input to clock and control circuit 230 for programming the converter to provide control signals for the input HDTV format. This data can be input by an operator manually selecting the format to be employed or the format converter can be built for one specific format, for example, any format adopted by the United States. Based on the input HDTV format type and the FORMAT H-DRIVE IN and FORMAT V-DRIVE IN synchronization signals, clock and control circuit 230 outputs read, write and timing signals to conversion memory 240, thus instructing conversion memory 240 to convert the HDTV input format to a format suitable for recording on digital video recorder 150. Conversion memory control 230 controls conversion of the input HDTV format to luminance and chrominance data signals in accordance with FIGS. 9 and 10 which map data into memory 240.

Figure 3:
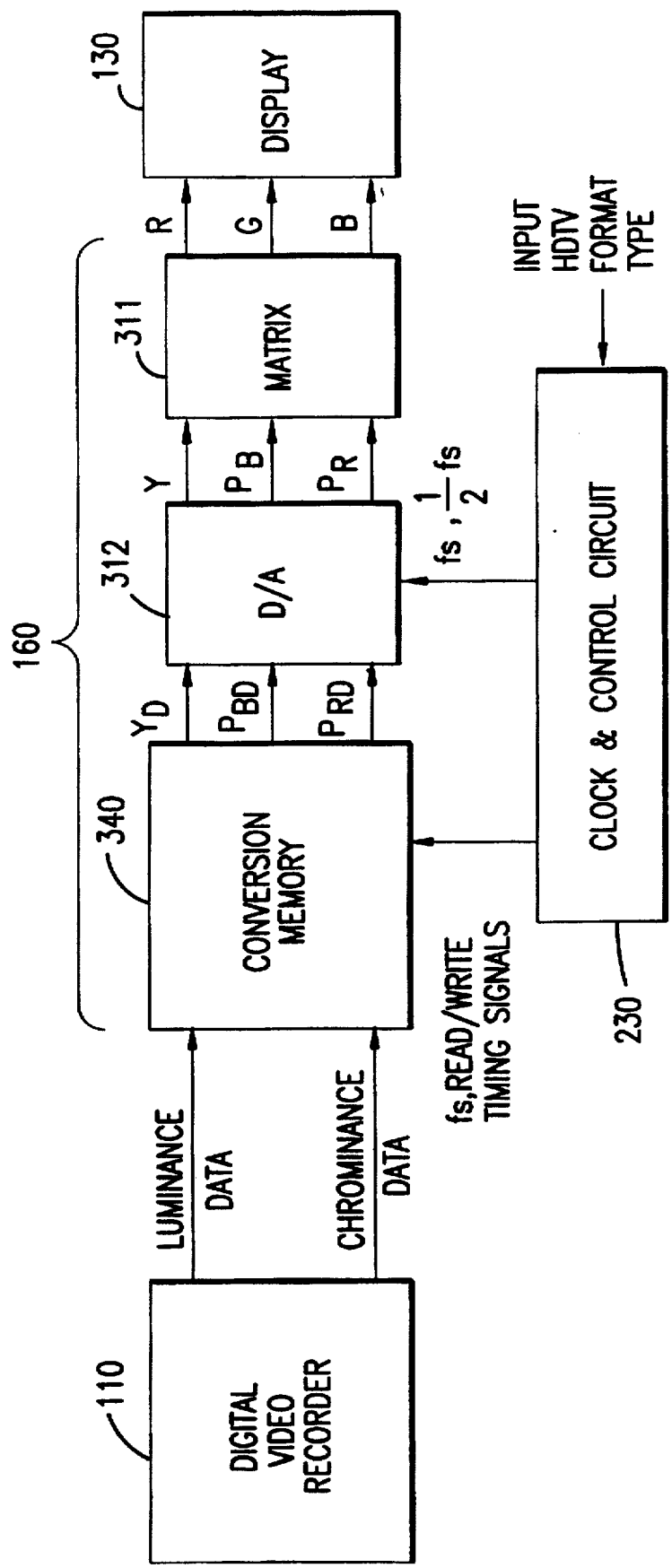
FIG. 3 is a block schematic diagram of components for playing back a signal on a digital video player in any HDTV format.

FIG. 3 illustrates converter 160 for converting the output of DVTR 110 in playback mode, to an HDTV format displayed, for example, on display monitor 130. In playback mode, converter 160 controls the operation of the DVTR and provides synchronizing information with the output of the converted video signal. Display 130 can be any output device such as a monitor, a cathode ray tube, liquid crystal display, projection screen, video cassette recorder, or other output, storage, conversion or transmission device. Conversion memory 340 converts the digital signals in accordance with control signals from clock and control circuit 230. Digital to analog converter 312 and matrix 311 perform the reverse functions of matrix 211 and analog to digital converter 212. Further details of conversion memory 340 and digital to analog converter 312 will be discussed subsequently in conjunction with FIG. 5. Further details of clock and control circuit 230 will be discussed in conjunction with FIG. 8.

Figure 4:
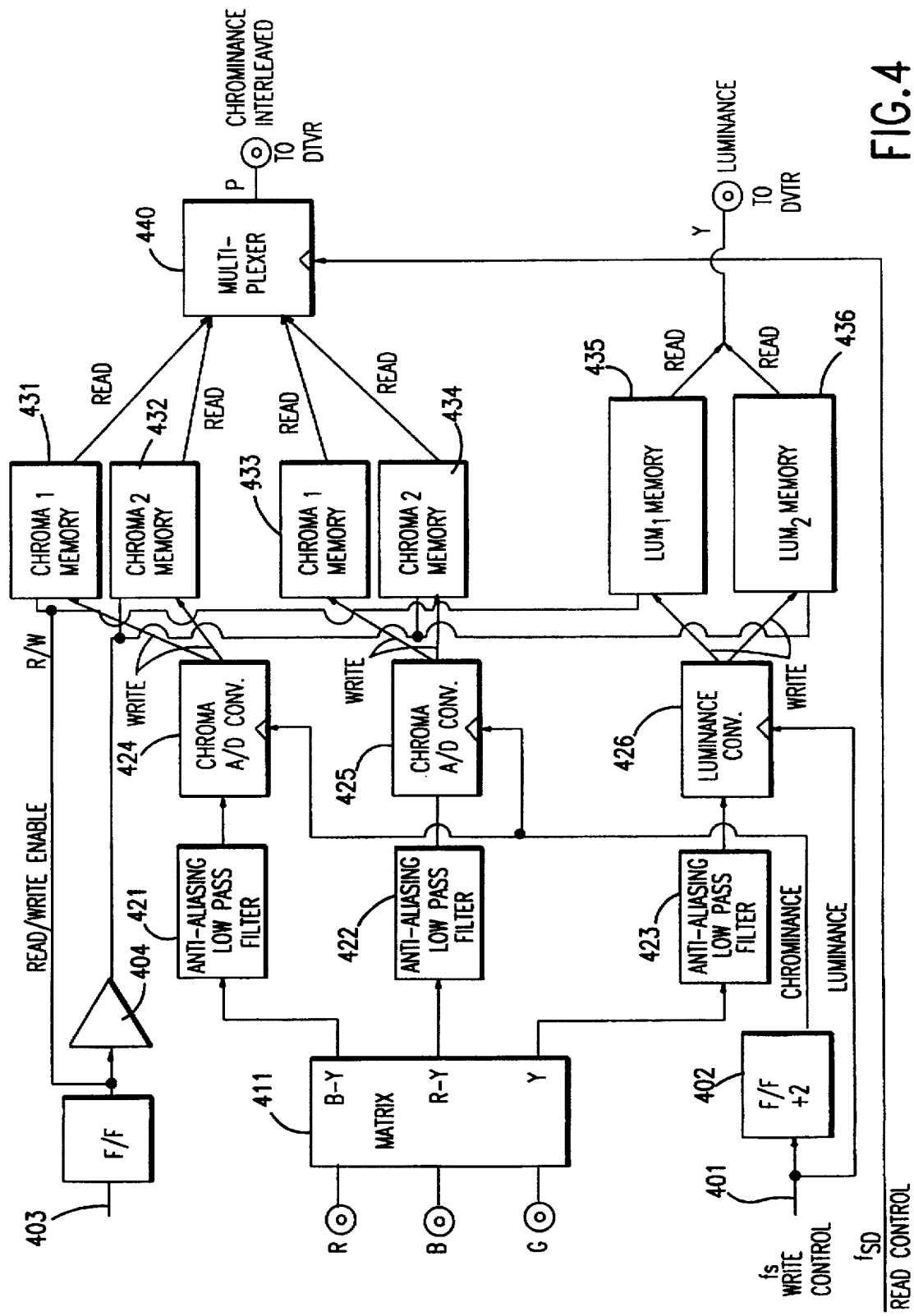
FIG. 4 is a detailed block schematic diagram of circuitry for converting an RGB HDTV signal to digital luminance and chrominance inputs for a given HDTV recorder.

FIG. 4 illustrates in greater detail the components of FIG. 2. FIG. 4 particularly illustrates matrix 411, anti-aliasing filters 421–423, the individual components of analog to digital converters 424–426, memories 431–436 and multiplexer 440 during record mode. Matrix circuit 411 converts an analog RGB input signal to luminance and color difference signal outputs. Anti-aliasing low pass filters 421, 422 and 423 as well as analog to digital converters 424, 425 and 426 are shown connected to the outputs of matrix 411 B-Y, R-Y and Y, respectively. Write clock control signal 401 from controller 230 clocks luminance analog to digital converter 426 at $f_s$ and chrominance analog to digital converters 424 and 425 at ½ $f_s$ via divide by two flip-flop 402.

Two memories are connected to the output of each analog to digital converter. Memories 431 and 432 are connected to the output of B-Y chrominance analog to digital converter 424 under read/write control 403 by controller 230. Likewise, memories 433 and 434 are connected to the output of R-Y chrominance analog to digital converter 425 and memories 435 and 436 are connected to the output of luminance analog to digital converter 426 under read/write control 403 by controller 230. Read/write control 403 from controller 230 controls alternatively read and write functions for the first and second memories connected to each analog to digital converter. For example, memory 431 alternatively reads and writes with respect to memory 432 under control of read/write control signal 403. Read/write control signal 403 connects directly to the first memory, for example, and read/write control signal 403 inverted by inverter 404 connects to the second memory. Consequently, under control of read/write control signal 403 from controller 230, digital video information can be written into the one memory and simultaneously read out of the other memory. Controller 230 controls addressing of video data written into and read out of the memories thereby performing a desired conversion between formats such as the conversion exemplified by FIGS. 7, 8, 9, and 10. Further details of the read/write clocking and control will later be described in conjunction with FIGS. 6(a) and 6(b).

Multiplexer 440 combines the outputs of memories 431, 432, 433 and 434 to yield a single chrominance signal. In particular, for the Sony HDD-1000 or Hitachi DVTR examples, the output of multiplexer 440 is an 8 bit, byte-interleaved B-Y/R-Y chrominance data bit stream of 1920 bytes per line at a 59.94 Hz field rate. The field rate of 59.94 Hz is actually 60×(1000/1001) Hz. Multiplexer 440 is controlled by controller 230 using a 74.175 MHz control signal to match the exemplary HDD-1000 74.175 megabyte per second data rate at a 59.94 Hz field rate. Because the chrominance memory outputs are multiplexed together, each chrominance memory only needs to be half the size of each luminance memory. The outputs of memories 435 and 436 are thus sequentially read to provide a 8-bit luminance data bit stream of 1920 bytes per line and at a 59.94 Hz field rate.

According to the Nyquist criterion, no spectral component of any signal should exceed one-half the digitizing clock frequencies $f_s$ for luminance and 0.5 $f_s$ for chrominance. Therefore, low pass filters 421–423 shown in FIG. 4 are used in conjunction with analog to digital converters 424–426, respectively. The low pass filters can also be called anti-aliasing filters. Low pass filter 423 on the luminance component preferably has a −3 dB drop off at approximately 0.4 $f_s$. Low pass filters 421 and 422 on the two chrominance components should have a −3 dB drop off at approximately 0.2 $f_s$. The filters should not cut off extremely rapidly at the Nyquist frequency of 0.5 $f_s$ and 0.25 $f_s$ respectively.

Figure 5:
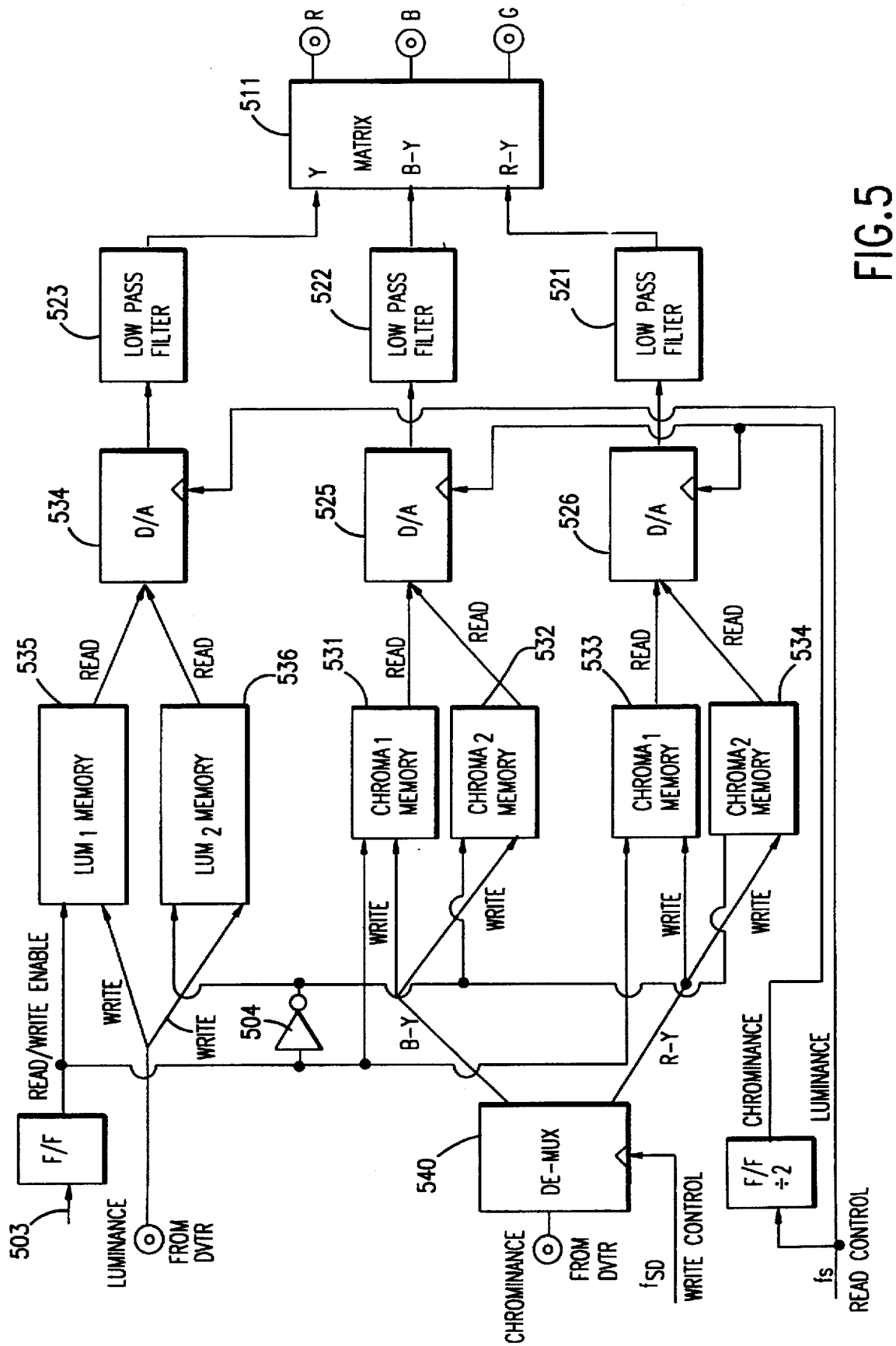
FIG. 5 is a detailed block schematic diagram of components for converting, to an RGB signal, digital luminance and chrominance outputs from a given HDTV player.

FIG. 5 illustrates in greater detail the components of FIG. 3. FIG. 5 particularly illustrates conversion memory 340 (memories 531–536), digital to analog converter 312 (converters 524–526) and matrix 311 (matrix 511) during playback mode. Read/write control 503 from controller 230 controls memory pairs for alternating read and write. Luminance data from, for example, digital video player 110 is alternately written in memories 535 and 536. The chrominance signal from digital video player 110 is de-multiplexed by de-multiplexer 540 using the 74.175 MHz control signal from control circuit 230 for the 59.94 Hz field rate. De-multiplexer 540 splits the chrominance signal into a B-Y signal stored in memories 531 and 532 and a R-Y signal stored in memories 533 and 534. Controller 230 controls the reading and writing from the memories to perform conversion back to the original HDTV format. The conversion controlled by controller 230 is performed in response to a desired input HDTV format programmed into the controller similarly as the control discussed above in conjunction with FIG. 4.

After conversion to the digital HDTV format, the outputs of the memories are respectively fed to digital to analog converters 524, 525 and 526. The outputs of the above-mentioned digital to analog converters are respectively connected to low pass filter 523 having negligible response at ½ $f_s$ (about 38 MHz) and low pass filters 522, 521 having negligible response at ¼ $f_s$ (about 15 MHz). The outputs of low pass filters 521, 522 and 523 feed through matrix 511 to produce an RGB high definition television output.

Figure 6A:
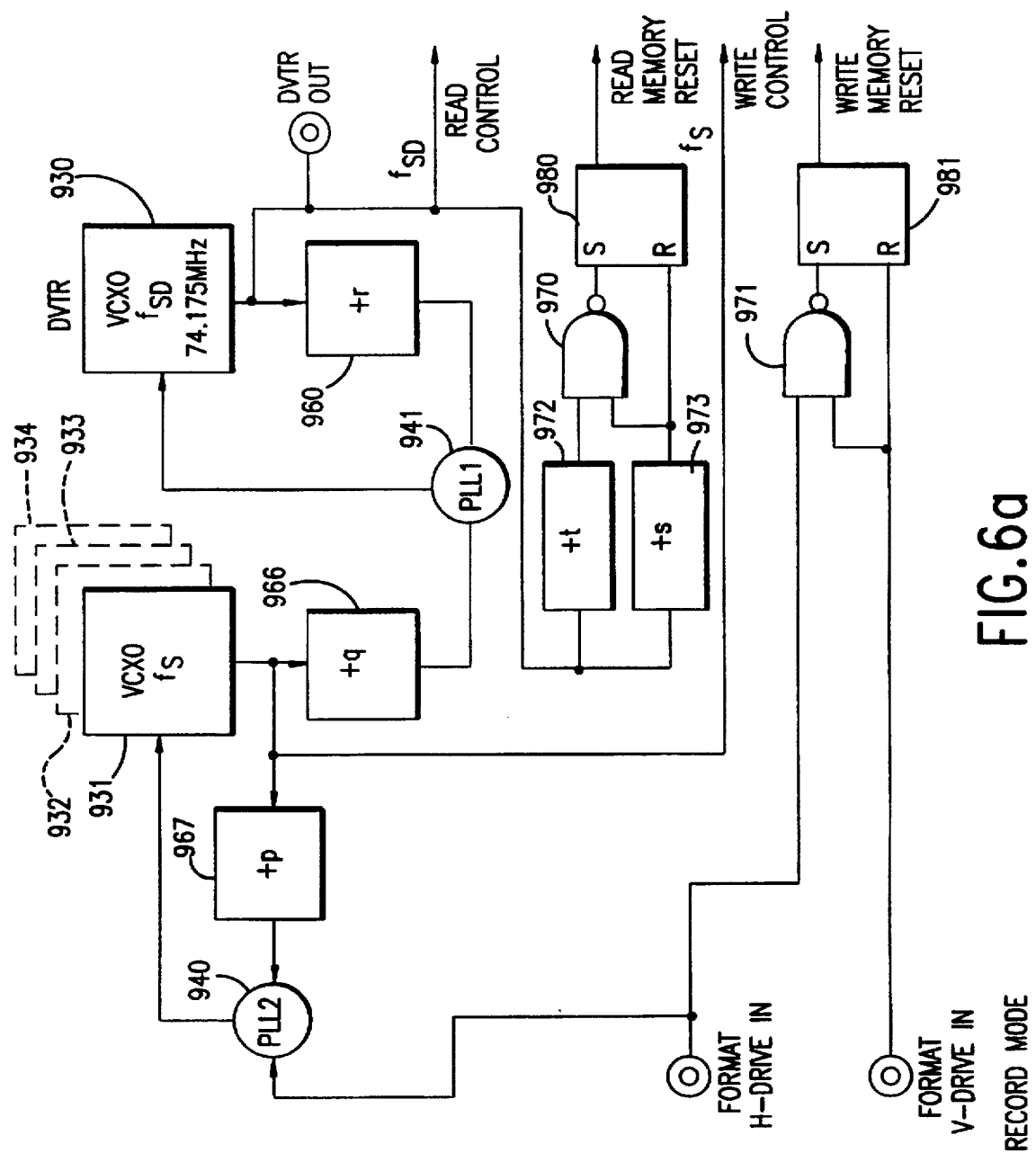
FIGS. 6(a) and (b) are respectively record mode and playback mode generic block schematic diagrams for clock and control oscillators.
Figure 6B:
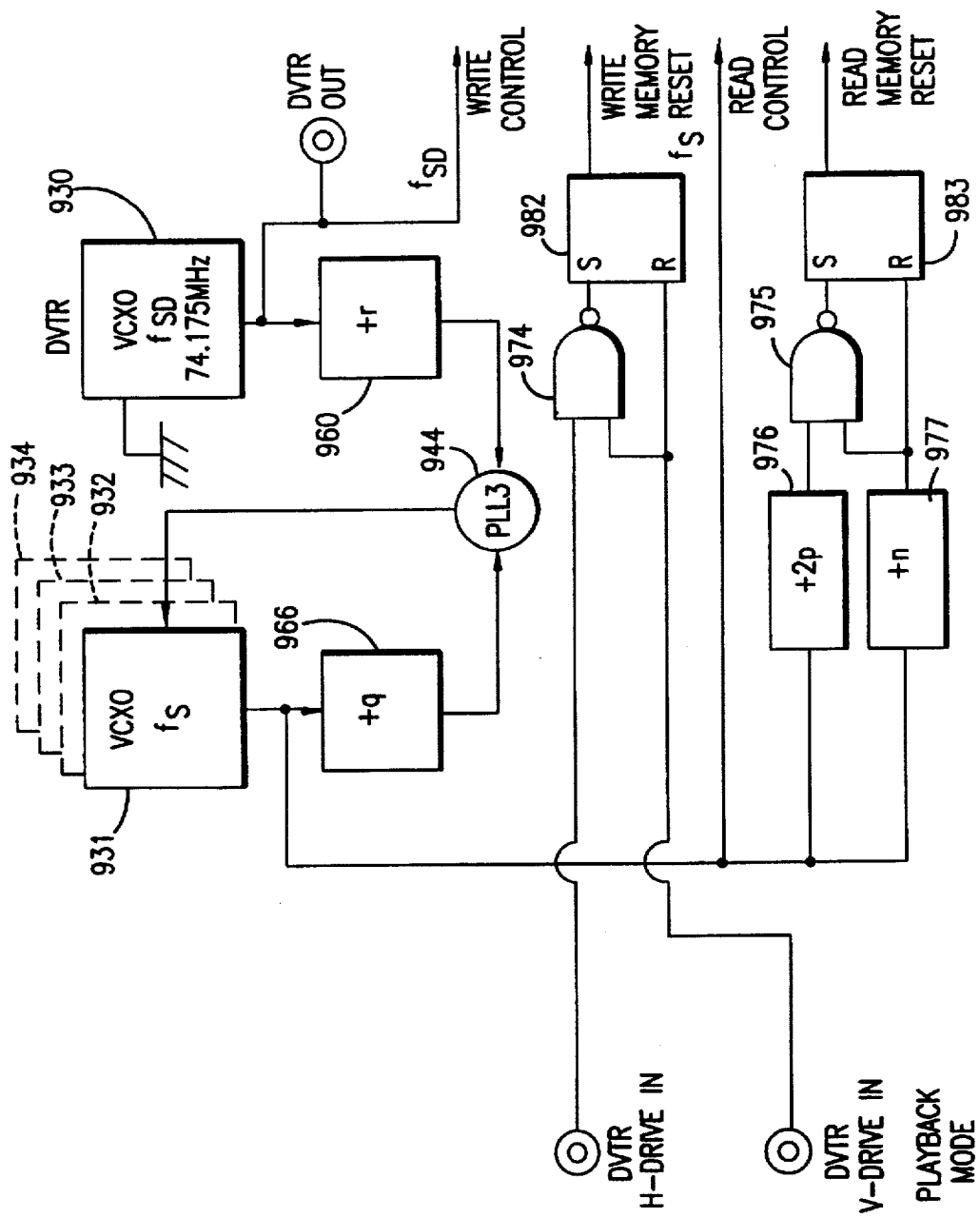

FIGS. 6(a) and 6(b) illustrate the clocking and control circuitry 230 to derive READ CONTROL, READ MEMORY RESET, WRITE CONTROL, WRITE MEMORY RESET and DVTR OUT synchronization control signals. FIG. 6(a) derives the signals for the record mode based on H-DRIVE IN and V-DRIVE IN from a broadcaster or proposed format source. In the record mode, the proposed format sampling rate $f_s$ oscillator 931 is locked to the broadcaster or proposed format source via phase locked loop PLL2 940. The DVTR is locked at DVTR frequency 74.175 MHz for the HDD-1000 by oscillator 930 locked to oscillator 931 via phase locked loop PLL1 941. FIG. 6(b) derives the signals for the playback mode wherein DVTR oscillator 930 drives the entire system like the broadcaster or proposed format source drove the entire system in the record mode. DVTR oscillator 930 drives the DVTR via DVTR OUT at 74.175 MHz for the HDD-1000. DVTR oscillator 930 also controls the sampling frequency $f_s$ oscillator 931 via phase locked loop PLL3 944.

FIG. 6(a) illustrates a generic depiction of the components for control in the record mode. Oscillator 931 is locked to FORMAT H-DRIVE IN via phase locked loop PLL2 940. Divide-by 967 divides down the output of oscillator 931 by p for a comparison in phase locked loop comparator 940 with the FORMAT H-DRIVE IN signal. The output of PLL2 comparator 940 trims the frequency of crystal oscillator VCXO 931. The output of crystal oscillator VCXO 931 and the output of DVTR crystal oscillator VCXO 930 are compared in phase locked loop PLL1 comparator 941. The output of phase locked loop PLL1 comparator 941 trims the frequency of crystal VCXO 930. The output of oscillator 931 is divided by q in divide-by 966 and the output of oscillator 930 is divided by r in divide-by 960 before comparison in phase locked loop PLL1 comparator 941.

The output of crystal VCXO 930 divided by t in divide-by 972 and divided by s in divide-by 973 is combined by NAND gate 970 and set by flip-flop 980 to yield the READ MEMORY RESET synchronization control signal. The FORMAT H-DRIVE IN and FORMAT V-DRIVE IN are combined by NAND gate 971 and set by flip-flop 981 to yield the WRITE MEMORY RESET synchronization control signal.

The DVTR OUT synchronization control signal of FIG. 6(a) drives the DVTR. The READ CONTROL and WRITE CONTROL synchronization control signals clock memory addresses for i.e. luminance read memory 435 and luminance write memory 436, respectively. Memories 431–436 are addressed by address counters (not shown). The address counters are programmed to count up to the number of necessary storage spaces required for conversion. The READ MEMORY RESET and WRITE MEMORY RESET synchronization control signals reset i.e. luminance read memory 435 and luminance write memory 436, respectively. When a memory is reset by a READ or a WRITE MEMORY RESET synchronization control signal, the signal's associated memory resets to a reference storage space—such as the upper-left corner of the frame.

VCXO oscillators 931 and 930 are preferably crystal oscillators. A crystal oscillator has a crystal ground to produce a very stable and accurate frequency. The oscillation frequency of the crystal can be controlled by a voltage controlled capacitor (varicap) or similar reactive means. Such an accurate crystal oscillator is an ideal oscillator for accurate phase locked loop (PLL) frequency control. As an alternative to crystal VCXO oscillators, microprocessor control oscillators can be used in the event a microprocessor controlled oscillator is available having a frequency stability comparable to that of a crystal VCXO.

FIG. 6(b) illustrates a generic depiction of the components for control in the playback mode. Sampling frequency $f_s$ crystal oscillator VCXO 931 and DVTR crystal oscillator VCXO 930 are compared in phase locked loop comparator PLL3 944 to control the frequency of oscillator 931. The output of phase locked loop PLL3 comparator 944 trims the frequency of oscillator 931. The output of oscillator 931 is divided by q in divide-by 966 and the output of oscillator 930 is divided by r in divide-by 960 before comparison in phase locked loop comparator 944.

The DVTR H-DRIVE IN and DVTR V-DRIVE IN are combined in NAND gate 974 and set by flip-flop 982 to yield the WRITE MEMORY RESET synchronization control signal. The output of crystal VCXO 931 divided by 2p in divide-by 976 and divided by n in divide-by 977 is combined in NAND gate 975 and set by flip-flop 983 to yield the READ MEMORY RESET synchronization control signal.

The DVTR OUT synchronization control signal of FIG. 6(b) drives the DVTR. The READ CONTROL and WRITE CONTROL synchronization control signals clock memory addresses for i.e. luminance read memory 535 and luminance write memory 536, respectively. Memories 531–536 are addressed by address counters. The address counters are programmed to count up to the number of necessary storage spaces required for conversion. The READ MEMORY RESET and WRITE MEMORY RESET synchronization control signals reset i.e. luminance read memory 535 and luminance write memory 536, respectively. When a memory is reset by a READ or a WRITE MEMORY RESET synchronization control signal, the signal's associated memory resets to a reference storage space—such as the upper-left corner of the frame.

In the above, the addressed memory can be a random access memory in size dependent upon the number of DVTR lines necessary for a complete sequence of chrominance and luminance lines. Instead of a random access memory, the memory can be a sequential address memory. The READ and the WRITE MEMORY RESET pulses from the NAND gates can be used to reset the sequential access memories to their first memory locations. When using a sequential access memory, the dummy samples illustrated in FIGS. 7 and 8 preferably should be inserted between lines during the time of the horizontal interval. Therefore, from FIG. 7, dummy sample 612 should be inserted between lines 610 and 611 at 612a; dummy sample 614 should be inserted between lines 611 and 613 at 614a; dummy sample 617 should be inserted between either/or lines 613 and 615 or lines 615 and 616 at 617a and/or 617b; dummy sample 619 should be inserted between lines 616 and 618 at 619a; and dummy sample 621 should be inserted between dummy samples 618 and 620 at 621a. By inserting the dummy samples between lines, the dummy samples can be stored in the sequential access memory during the horizontal interval. When using a random access memory, the dummy samples do not need to be placed at the end of a line for they can be randomly accessed or even skipped over by the addressing circuitry at any point in time.

Among the proposed HDTV formats, a first, a second and a third exemplary proposed format are described herein. These exemplary proposed formats are examples for teaching the present invention. They are in no way preferred over each other or over any other format. The first exemplary proposed format is representable as 1370 luminance (Y) samples per line of video signal and 685 chrominance (R-Y and B-Y) samples per line of video signal. Proper digital representation for the first exemplary proposed format may require 1370 samples. This format has an active line time of approximately 17.8 microseconds and a RGB signal bandwidth is 28.9 MHz. Accordingly, the minimum number of samples per active line to accurately reproduce the luminance signal is 2.5×28.9×17.8 or 1286 samples. The factor 2.5 allows for practical Nyquist frequency filter rolloff, corresponding to the 1/.4 factor discussed elsewhere in this text.

Figure 8:
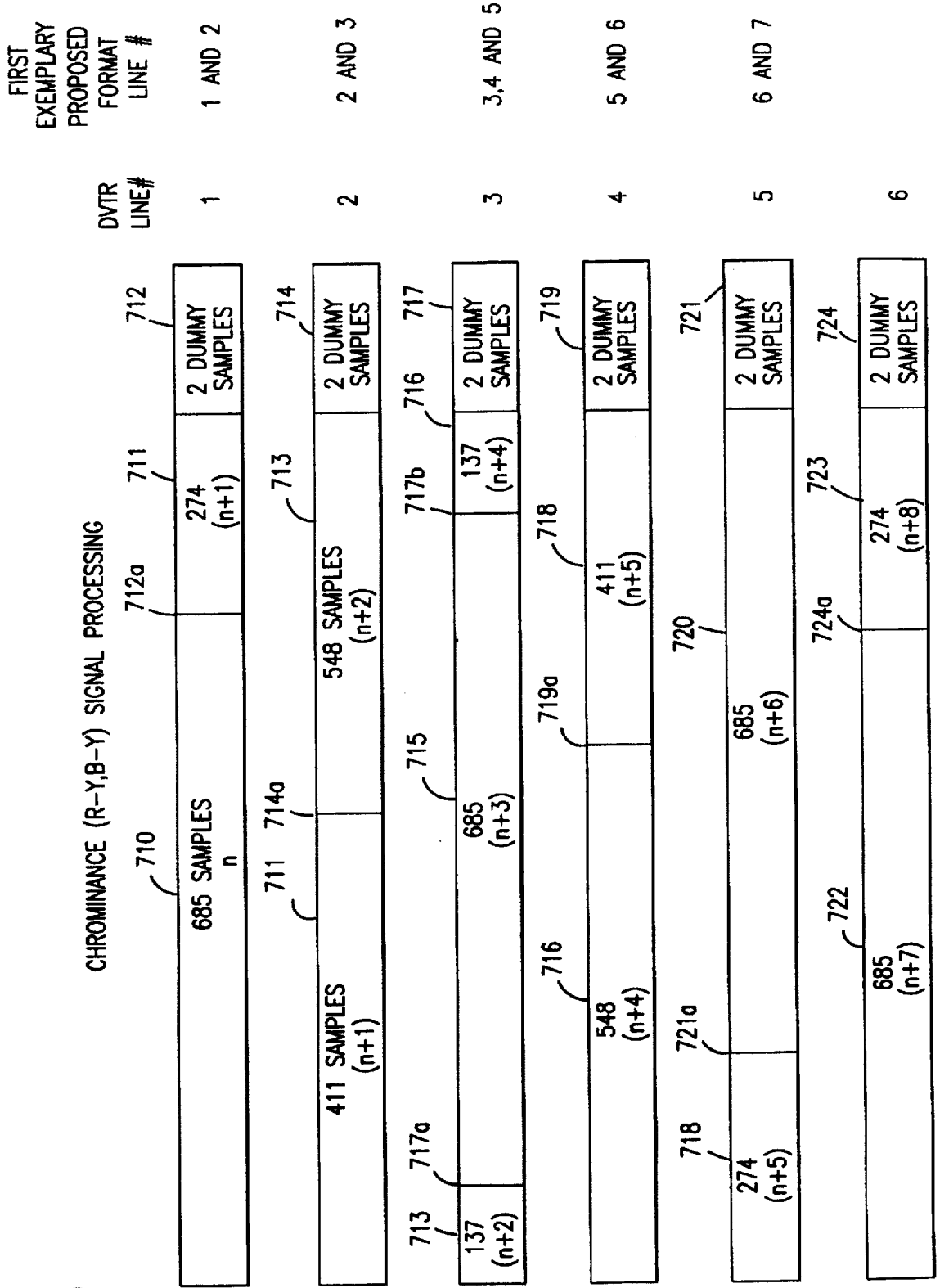
FIG. 8 illustrates seven lines of a first exemplary proposed HDTV format included in five lines of a digital chrominance signal of the recorder.

In accordance with FIGS. 7 and 8, for the first exemplary proposed HDTV format, the memories 435 and 436 are written into and read out of in a manner corresponding to the 1920 samples per line permitted by the exemplary HDD-1000 DVTR. An entire 1370 sample first luminance line 610, a first portion of 548 samples of a second luminance line 611 and 2 dummy samples 612 make up DVTR line #1, to be stored in memory 435 or 436. A second portion of 822 samples of the second luminance line 611, a first portion of 1096 samples of a third luminance line 613 and 2 dummy samples 614 make up DVTR line #2. A second portion of 274 samples of the third luminance line 613, an entire 1370 sample fourth luminance line 615 and a first portion of 274 samples of a fifth luminance line 616 and 2 dummy samples 617 make up DVTR line #3. A second portion of 1096 samples of the fifth luminance line 616, a first portion of 822 samples of a sixth luminance line 620 and 2 dummy samples make up DVTR line #4. A second portion of 548 samples of the sixth luminance line 618, an entire 1370 sample seventh luminance line and 2 dummy samples make up DVTR line #5. DVTR line #6 begins with a next entire 1370 sample line, thus repeating the above sequence of seven luminance lines every five DVTR lines. The partitioning of luminance lines and the number of dummy samples are chosen to adapt a given number of luminance lines into a given number of DVTR lines and thus have a predictable repeating pattern, thus minimizing memory size.

Alternatively, the dummy samples may be located between lines, especially in the instance of a sequential access memory. Thus, dummy samples 612 may be located at location 612a, dummy samples 614 at location 614a, and so on during the time of the horizontal blanking interval.

FIG. 8 illustrates an 685 sample R-Y or B-Y chrominance line 710 corresponding to 1370 sample luminance line 610 of the first exemplary proposed format illustrated in FIG. 7.

FIG. 8 illustrates the conversion of source lines to DVTR lines output of either memories 433 and 434 for B-Y chrominance lines and memories 431 and 432 for R-Y chrominance lines. Because the R-Y and B-Y chrominance lines are multiplexed together by multiplexer 440, the number of samples of each chrominance source line (685 samples) are half that of each luminance source line (1370 samples). Thus, partitioning of the chrominance source lines and the use of dummy samples in FIG. 8 is similar to FIG. 7.

As described in connection with FIG. 7, dummy samples may be inserted between lines at locations 712a, 714a, 717a, 717b, 719a, 721a and so on.

Depending on the format recorded, any number of dummy samples, including zero dummy samples per line, are possible when the partitioning of source lines is chosen. The dummy samples are not necessary for conveying information but may convey useful information by their use as parity bits, as synchronization bits, as memory row identification bits or the like. For example, the dummy samples can be used to indicate the beginning of each new frame. In the event the DVTR should drop data or lose sync, the dummy sample would permit quick correction of the error. Dummy samples can also be used to indicate the beginning of a new frame when the converted format is interlaced at i=2, for example, for correction in the event of an error.

Figure 9:
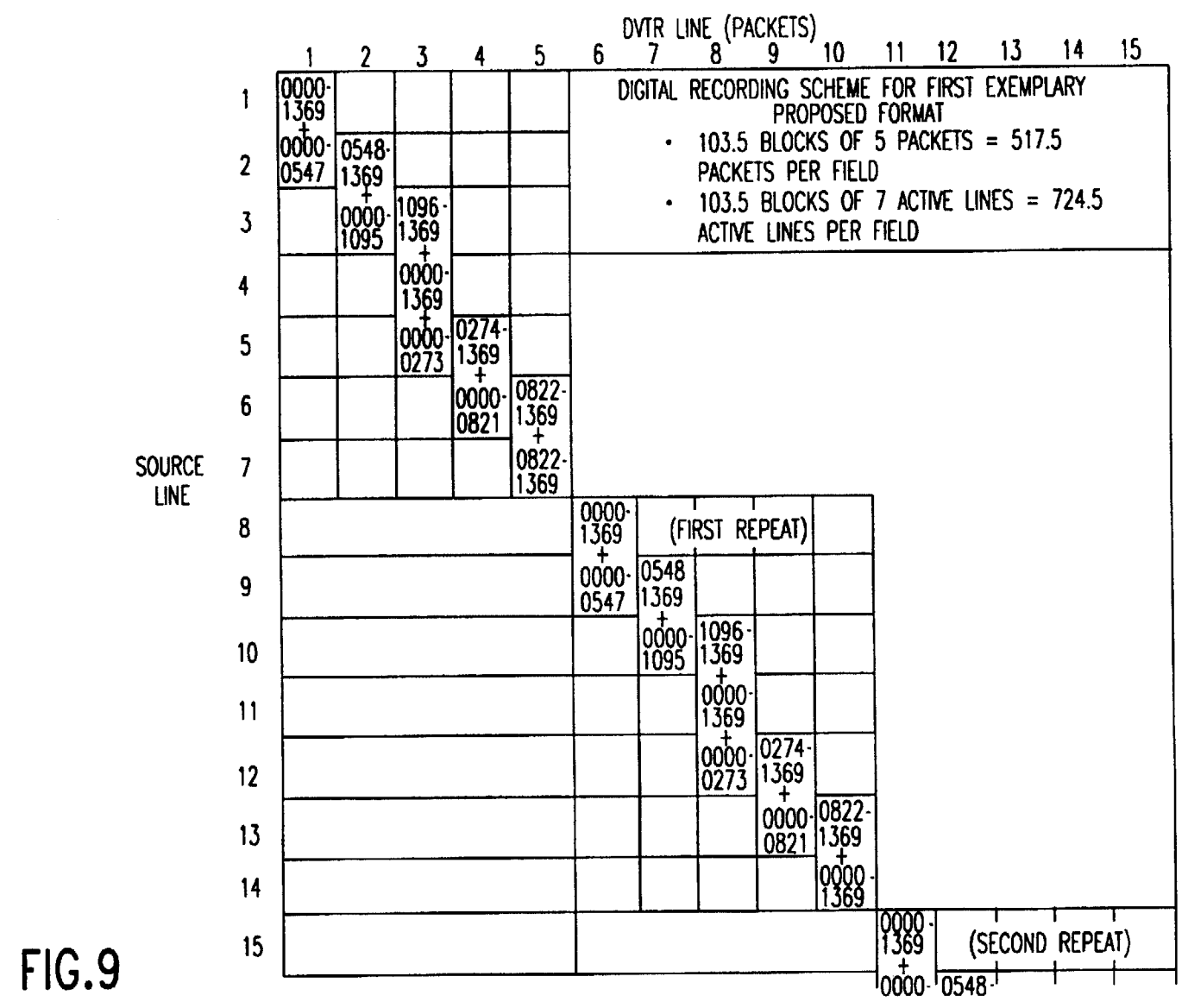

FIG. 9 illustrates how the seven luminance or chrominance source lines for the first proposed exemplary format are fit into five DVTR lines. DVTR 110, for example, of FIG. 3 dictates the DVTR lines and display 130, for example, dictates the source lines. Note that after a predetermined number of source or DVTR lines, the source and DVTR line pattern repeats.

FIG. 10 illustrates a second exemplary proposed format having 2055 samples per line. Note that after a predetermined number of fourteen source lines and fifteen DVTR lines, the pattern repeats. The exemplary format of FIG. 10 also uses 2 dummy samples per DVTR tape line.

Figure 11A:
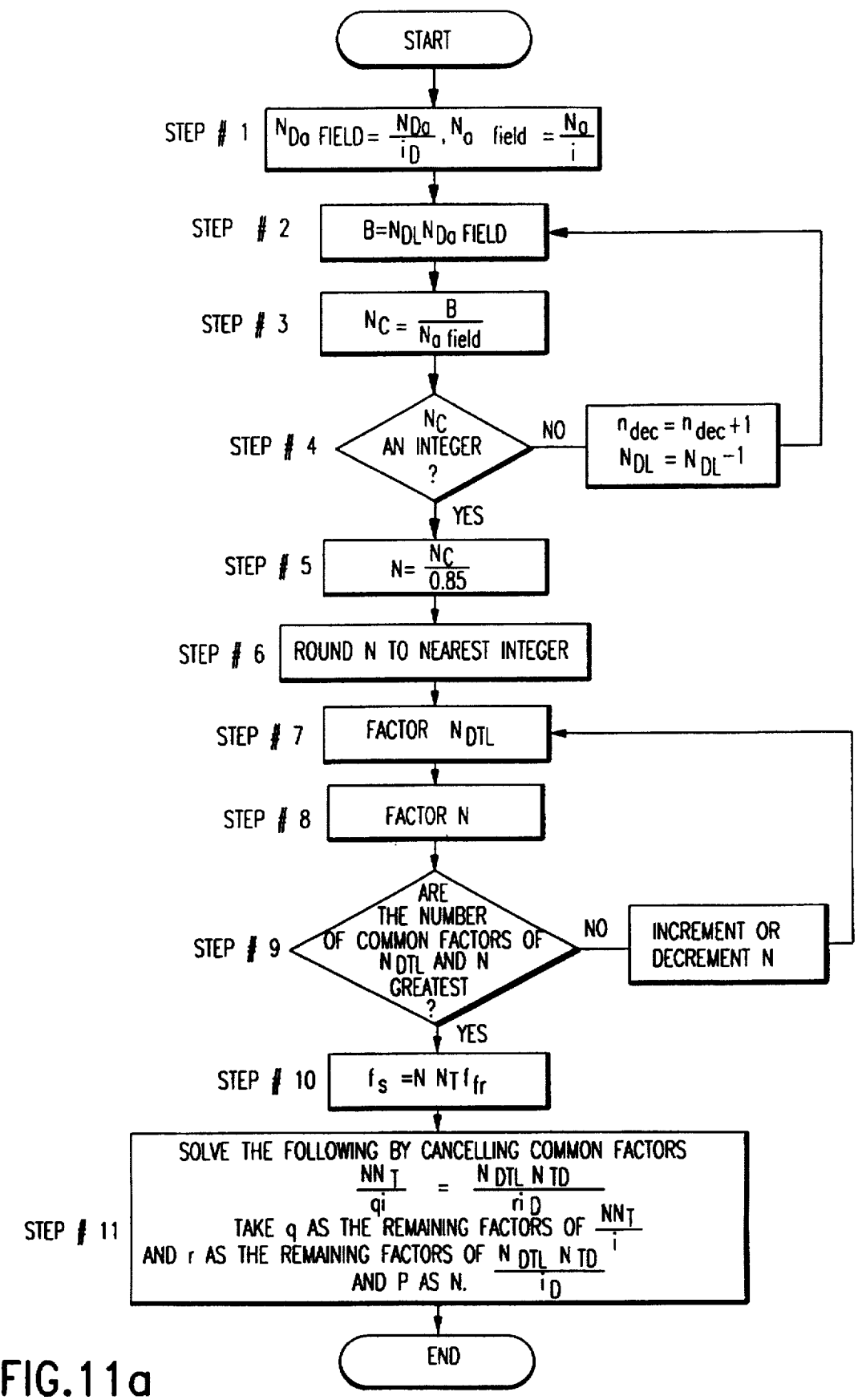
FIGS. 11(a) and (b) are flowcharts describing the structuring of converter parameters for any proposed format.
Figure 11B:
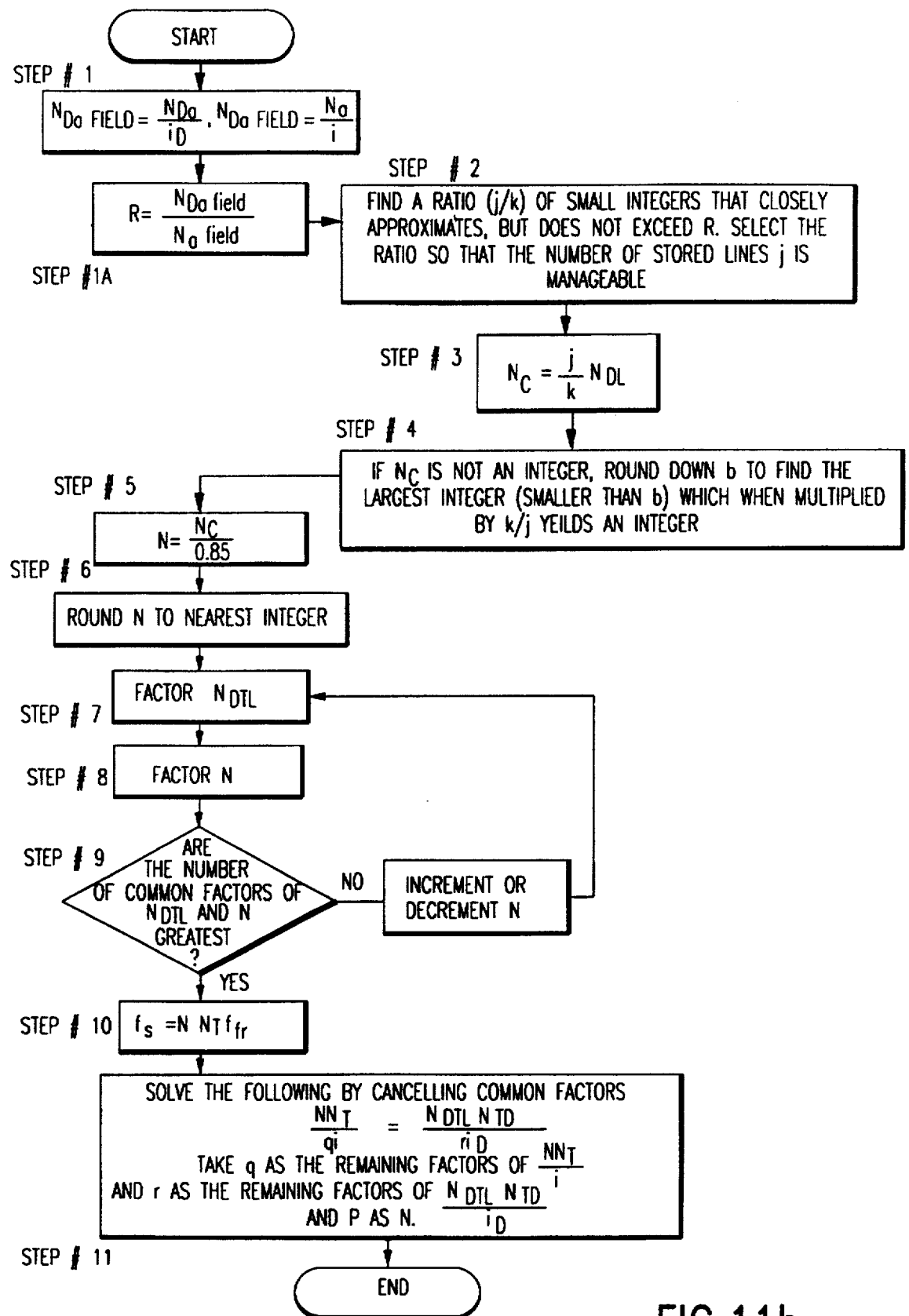

FIG. 11(a) is a flowchart illustrating the following method steps 1–11 according to a first embodiment and FIG. 11(b) is a flowchart illustrating the following method steps 1–11 according to a second embodiment. Any proposed format can be realized in a programmable converter as described below:

Digital Video Tape Recorder (DVTR) Variables
  Given for a DVTR
  1) the number of total lines per frame ($N_{DT}$),
  2) the number of active lines per frame ($N_{Da}$),
  3) the number of total luminance samples (bytes) per line ($N_{DTL}$),
  4) the number of active luminance samples (bytes) per line ($N_{DL}$),
  5) a DVTR field rate (fields per second) equal to the proposed format field rate ($f_{vd}=f_v$)
  6) the interlace characteristic of the DVTR [$i_D$1:1=1 field/frame 1:2=2 fields/frame 1:3=3 fields/frame ... ], and
  7) $f_{sD}$ number of active luminance samples per second Proposed Format Variables
  Given for a proposed format
  a) the number of total lines per frame ($N_T$),
  b) the number of active lines per frame ($N_a$),
  c) a proposed format field rate (fields per second) equal to the DVTR field rate ($f_v=f_{vd}$),
  d) the interlace characteristic of the proposed format [i 1:1=1 field/frame 1:2=2 fields/frame 1:3=3 fields/frame ... ], and
  e) the minimum number of luminance samples (bytes) per line ($N_L$).

Steps for Deriving the Number of Dummy Samples According to a First Embodiment

Step #1 Determine the number of active lines in a field of the DVTR and the number of active lines in a field of the proposed format.

$$N_{Dafield} = \frac{N_{Da}}{i_D}$$

$$N_{afield} = \frac{N_a}{i}$$

Step #2 Determine the number of active luminance samples (bytes) per field for the DVTR $$B = N_{DL} \, N_{Da} \text{ field}$$

Step #3 Determine the number of active luminance samples of the proposed format samples (bytes) to arrange on a DVTR active line ($N_c$)

$$N_C = \frac{B}{N_{afield}}$$

The result, $N_c$, will not always be an integer. $N_c$ must be an integer because a digital sample (byte) can only be an integer.

Step #4 If $N_c$ is not an integer, decrement $N_{DL}$ by 1 and go to step #2.

When $N_c$ becomes an integer, the number of times $N_{DL}$ is decremented, $n_{dec}$, equals the number of dummy samples that will be used on each line.

Preferably, the integer $N_c$ will be an even number as $N_c/2$ will be the number of chrominance samples which preferably is an integer. Even numbers will be easier to divide by two in order to clock the ½ $f_c$ chrominance analog to digital and digital to analog converters. However, if an odd integer $N_c$ is used, the circuitry Will tolerate dropping one sample at the edge of every other line. Anti-aliasing low pass filters 421, 422, 521, 522 will also minimize any effects of the dropped half cycle.

$N_c$ thus equals the number of active luminance samples (bytes) 610 of a proposed active format luminance (Y) line placed on a DVTR line. The number of active samples (bytes) 710 of a proposed active format chrominance (R-Y) line or (B-Y) line placed on a DVTR line thus equals ½ $N_c$ because the chrominance component is divided in half by multiplexers 440 and 540 for the chrominance lines. The line arrangements of FIGS. 7 and 8 can thus be determined from the calculated $N_c$ samples (bytes) placed among the repeated lines. The $N_c$ samples are placed among the lines with $n_{dec}$ dummy samples at the end of each line. Eventually a pattern will repeat over and over after a number of lines (five lines for the first exemplary proposed format, fourteen lines for the second exemplary proposed format and five lines for the third exemplary proposed format).

Steps for Deriving the Number of Dummy Samples According to a First Embodiment

Step #1 Determine the number of active lines in a field of the DVTR and the number of active lines in a field of the proposed format.

$$N_{Da\,field} = \frac{N_{Da}}{i_D}$$

$$N_{a\,field} = \frac{N_a}{i}$$

Step #1A Determine the ratio (R) of active lines in a field of the DVTR to active lines in a field of the purposed format.

$$R = \frac{N_{Da\,field}}{N_{a\,field}}$$

Step #2 Find a ratio (j/k) of integers that closely approximate but do not exceed R. The ratio should be selected so that the number of stored lines j is manageable.

The proposed active format lines will be stored in j lines of memory, each line of memory being $N_{DL}$ samples (bytes) in length. As j directly expresses the size of the memory, it is desirable to minimize the value of j. The smaller the ratio j/k, the lesser the cost of the memory. A value for j of at least about 16 is desirable for inexpensive digital construction.

Step #3 Determine the number of active luminance samples (bytes) per active DVTR line.

$$N_C = \frac{j}{k} N_{DL}$$

If $N_c$ is not an integer, some number d of dummy samples must be added to the real active luminance bytes to comprise a total of $N_{DL}$ active luminance samples (bytes) per active line to be recorded.

Step #4 If $N_c$ is not an integer, round down to find the largest integer (less than b) which when multiplied by k/j yields an integer i.

When $N_c$ becomes an integer, the number of dummy samples d that will be used on each line is $d=N_{DL}-i$.

Now that the memory arrangement and number of dummy samples for each DVTR line has been determined by either of the above embodiments, how to provide oscillators for generating the clock and control signals and how to control the oscillators will be discussed below.

Steps for Deriving $f_s$, p, q and r

The active portion of a television line is approximately 85% of the total line time.

Step #5 Determine the number of proposed format active luminance samples to be stored per active DVTR line $$N = \frac{N_C}{0.85}$$

The result, N, will not always be an integer. In order for digital generation, N, must be an integer.

Step #6 Round N to the nearest integer.

In effect, by rounding the approximated 85% blanking time is slightly varied up or down until the nearest integer for N is arrived at.

For accurate PLL oscillator control, a small number of low prime integers are desired to divide the oscillator outputs before comparison in the PLL comparator. The preferred integers are the remaining factors derived from the above divided N and from the number of total luminance samples per line $N_{DTL}$.

Step #7 Factor $N_{DTL}$.

Step #8 Factor N. Check for common factors of $N_{DTL}$ and N.

Step #9 Increment and decrement N and jump to step #7 until the number of common factors of $N_{DTL}$ and N is greatest.

Alternatively, N $N_T$ and $N_{DTL}$ $N_{DT}$ can be factored. Then N can be incremented and decremented until the number of common factors of N $N_T$ and $N_{DTL}$ $N_{DT}$ is greatest.

Step #10 Compute the sampling frequency oscillator rate ($f_s$) in samples per second.

$$f_s = N\,N_T\,f_v$$

The incrementing and decrementing of N should only be performed within reasonable limits in order to provide a frequency for PLL comparison yielding less error than an oscillator PLL driven by dividers of many uncommon factors. If $N=N_{DTL}$, the two oscillators will be at the same frequency and a PLL is not required (i.e. 900 line, 59.94, 1:1, n=1200). Choosing a value for N may be performed in an iterative process until the designed circuit achieves an acceptable cost and accuracy tradeoff.

Step #11 Solve the following equation for q and r by first cancelling common factors.

$$\frac{N\,N_T}{qi} = \frac{N_{DTL}\,N_{DT}}{r\,i_D}$$

Then take q as the remaining factors of (N $N_T$/i) and r as the remaining factors of ($N_{DTL}$ $N_{DT}/i_D$).

N itself will be designated p for purposes of FIGS. 6(a) and 6(b) and 12(a)–14(b). As discussed in conjunction with FIGS. 6(a) and 6(b) and 12(a)–14(b), the remaining factors derived from $N_{DTL}$ and N are thus used as divide by factors p, q, and r for accurate frequency comparison by the phase locked loops.

Also, for purposes of FIGS. 6(a) and 6(b) and 12(a)–14(b), $t=N_{DTL}$, $s=f_{sD}/f_v$, and $n=2(N_T)(p)$.

The DVTR Variables Defined

The Sony HDD-1000 DVTR and the Hitachi DVTR have the following parameters:

1) $N_{DT}$=1125 total lines per frame
2) $N_{Da}$=1035 active lines per frame
3) $N_{DTL}$=2200 total luminance samples (bytes) per line
4) $N_{DL}$=1920 active luminance samples (bytes) per line
5) $f_v$=59.94 fields per second (or 60.—operator selectable.)
6) $i_D$=2 fields per frame
7) $f_{sD}$=74.175 MHz Other DVTRs can also be used.

Structuring the Converter Parameters for a First Exemplary Proposed Format According to the First Embodiment A first exemplary proposed format has the following parameters:

a) $N_T$=787.5 total lines per frame
b) $N_a$=720 active lines per frame
c) $f_v$=59.94 fields per second
d) i=1 field per frame Step #1, $N_{Da\,field}=N_{Da}/i_D$=1035 active lines per frame/2 fields per frame=517.5 active lines per field, $N_{a\,field}=N_a/i=$ 720 active lines per field/1 field per frame=720 active lines per field.

Step #2, $B=N_{DL}\,N_{Da\,field}$=(1920 active luminance samples (bytes) per line) (517.5 active lines per field)=993,600 active luminance samples (bytes) per field.

Step #3, $N_c=B/N_{a\,field}$=(993,600 active luminance samples (bytes) per field)/(720 active lines per field)=1380 active luminance samples (bytes) per active line.

Step #4. $N_c$ is thus an integer and $n_{dec}$=0 dummy samples.

Step #5. $N=N_c/0.85$=(1380 active luminance samples (bytes) per active line)/0.85=1623.529412 active luminance samples (bytes) per active line.

Step #6. N=1624 active luminance samples (bytes) per active line, rounded to the nearest integer.

Step #7. $N_{DTL}$=2200=2×2×2×5×5×11.

Step #8. N=1624=2×2×2×7×29. 1624 factors poorly and has few common factors with $N_{DTL}$.

Step #9 increment and decrement N until the number of common factors of $N_{DTL}$ and N is greatest. Take the larger factors of 2200, like 11, 5 and 2. Look for numbers close to 1624 (but not 2200) that have factors with 11, 5, 5 and 2 in them. 550=11×5×5×2. 2200/550=4. 4−1=3. 11×5×5×2×3= 1650. Therefore, an N of 1650 would work. Also, if factors with 11, 5 and 5 were tried instead, 275=11×5×5, 2200/275 8, 8−1=7 (seven is not a lowest prime to settle at just yet), 8−2=6=3×2, 11×5×2×3=1650. Therefore, N=1650 is used.

Step #10. $f_s$=N $N_T$, $f_v$=(1650 active samples (bytes) per line) (787.5 total lines per frame) (59.94 fields per second) =77.88461538 MHz.

Step #11

$$\frac{N\,N_T}{q^i} = \frac{N_{DTL}\,N_{DT}}{r\,i_D}$$

$$\frac{(1650)(787.5)}{q(1)} = \frac{(2200)(1125)}{r(2)}$$

$$\frac{(11\times 5\times 5\times 2\times 3)(1575)}{2q} = \frac{(2\times 11\times 5\times 2\times 5\times 2)(1125)}{2r}$$

$$\frac{(11\times 5\times 5\times 2\times 3)(5\times 5\times 3\times 3\times 7)}{2q} =$$

$$\frac{(2\times 11\times 5\times 2\times 5\times 2)(5\times 5\times 5\times 3\times 3)}{2r}$$

$$\frac{3\times 7}{q} = \frac{5\times 2\times 2}{r}$$

$$\frac{21}{q} = \frac{20}{r}$$

Figure 12A:
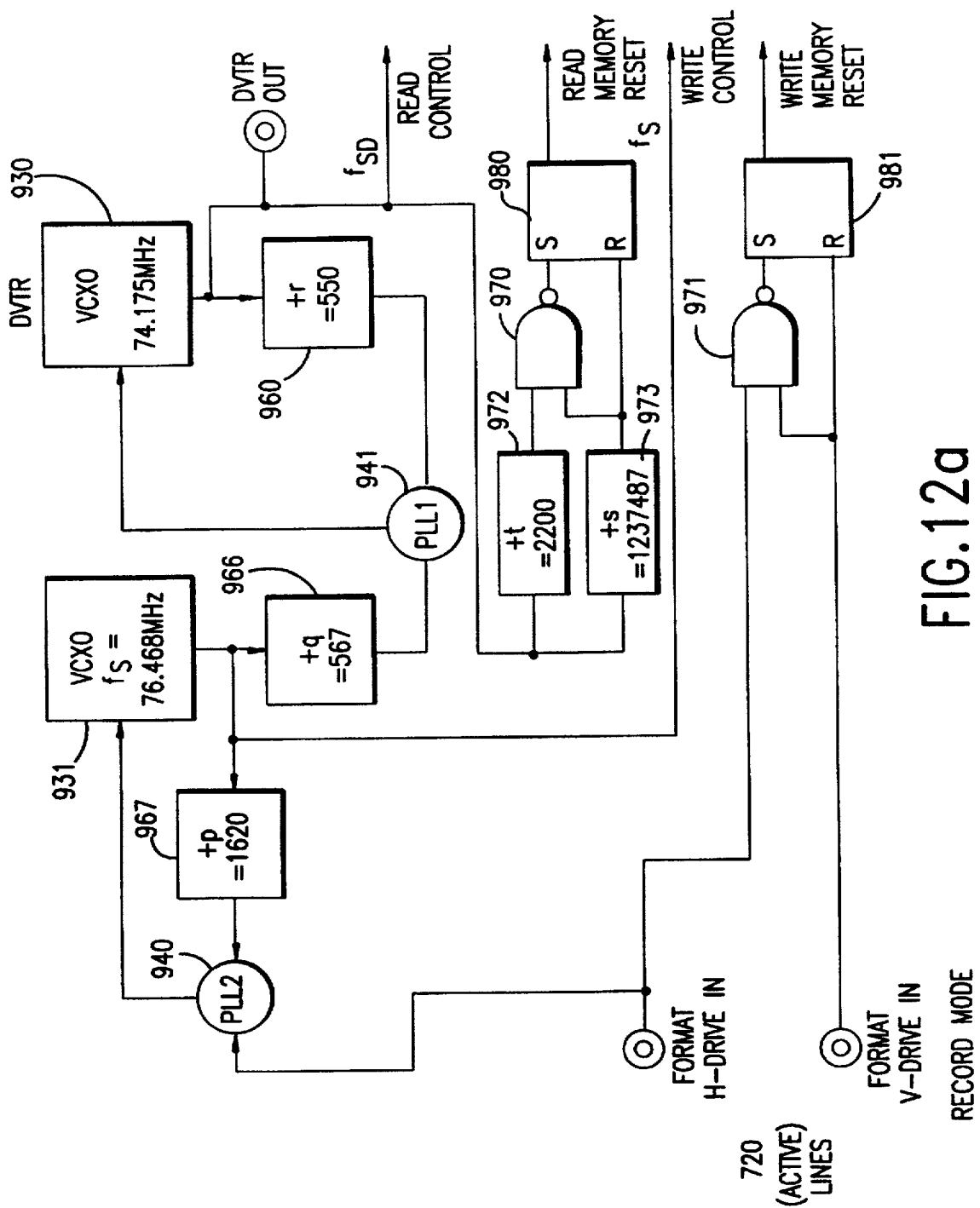
FIGS. 12(a) and (b) are respectively record mode and playback mode block schematic diagrams for clock and control oscillators for a first exemplary proposed format.
Figure 12B:
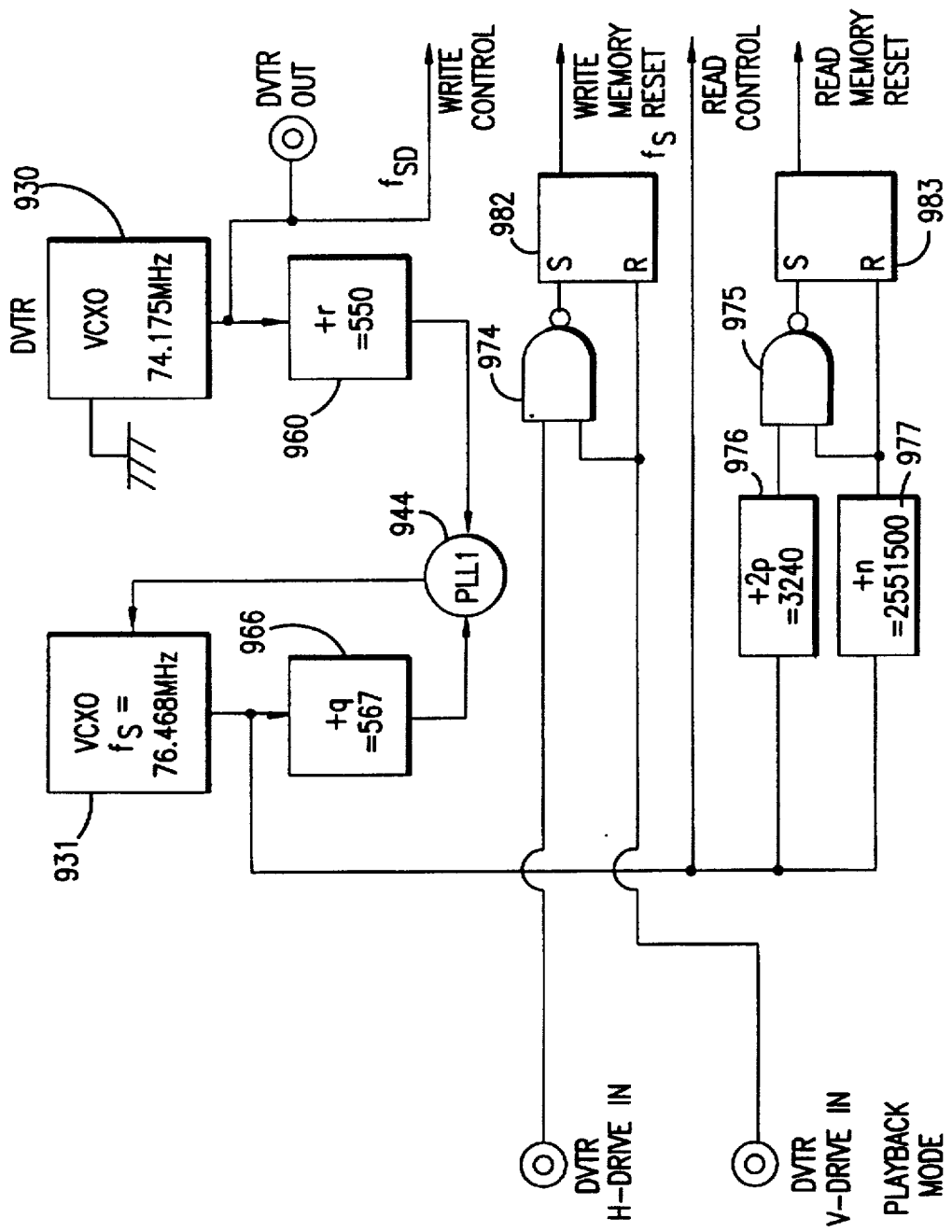

The product of the remaining factors of ($N_{DTL}\,N_{DT}/i_D$), 5, 2 and 2, equals 20 and is designated r. The product of the uncommon factors of N, 3 and 7, equals 21 and is designated q. N itself, 1650, is designated p. The control circuitry can be built for the first format by conforming the circuitry of FIGS. 6(a) and 6(b) with the above calculated variables. The control circuitry of the preferred embodiment for the first exemplary proposed format as illustrated in FIGS. 12(a) and 12(b) is built as calculated according to the second embodiment below. In the second embodiment, when j/k is selected as 5/7 instead of 23/32, a smaller memory size is achieved having two dummy samples. Dummy samples may be necessary when converting an interlaced format and/or for alleviating data errors. In a high volume commercial application, the variables determined by the first and second embodiments may need to be varied in order to achieve the lowest necessary error rate for the lowest tolerable cost per converter. When designing such a converter, an iterative design approach to using the first and second embodiments is necessary for the best tradeoff.

Structuring the Converter Parameters for a First Exemplary Proposed Format According to the Second Embodiment Step #1, $N_{Da}$ field=$N_{Da}/i_D$=1035 active lines per frame/2 fields per frame=517.5 active lines per field, $N_{a\ field}$=$N_a/i$= 720 active lines per field/1 field per frame=720 lines per field.

Step #1A. R=j/k=$N_{Da\ field}/N_{a\ field}$=517.5/720=0.71875.

Step #2. j/k=23/32, select a smaller ratio j/k that approximates 23/32 so that the memory size j is at most 16 (design choice for this example). Let j/k=5/7.

Step #3. $N_c$=(j/k) $N_{DL}$=(5/7) (1920 active luminance samples (bytes) per line)=1371.428571 active luminance samples (bytes) per line.

Step #4. $N_c$ is not an integer, round down $N_c$ to 1371, (7/5) (1371)=1919.4 which is not an integer, round down $N_c$ to 1370, (7/5) (1370)=1918 which is an integer. Therefore, $N_c$=1370 and d=1920−1918=2 dummy bytes per line.

Step #5. $N=N_c/0.85$=(1370 active luminance samples (bytes) per line)/0.85=1611.764706 active luminance samples (bytes) per line.

Step #6. N=1612 active samples (bytes) per line, rounded to the nearest integer.

Step #7. $N_{DTL}$=2200=2×2×2×5×5×11.

Step #8. N=1612=2×2×13×31. 1624 factors poorly and has few common factors with $N_{DTL}$.

Step #9 increment and decrement N until the number of common factors of $N_{DTL}$ and N is greatest. Take the larger factors of 2200, like 11, 5 and 2. Look for numbers close to 1612 (but not 2200) that have factors with 11, 5, 5 and 2 in them. 550=11×5×5×2. 1612/550=2.93. 11×5×5×2×3=1650. 1650 is not closest. Try numbers that have 5×2×2 in them. 5×2×2=20. 2200/20=100. 1612/20=80.6. 5×2×2×81=1620. Therefore, N=1620 is used.

Step #10. $f_s$=N $N_T f_v$=(1620 active samples (bytes) per line) (787.5 total lines per frame) (59.94 fields per second) =76.468455 MHz.

Step #11

$$\frac{N\,N_T}{q^i} = \frac{N_{DTL}\,N_{DT}}{r\,i_D}$$

$$\frac{(1620)(787.5)}{q(1)} = \frac{(2200)(1125)}{r(2)}$$

$$\frac{(2\times 2\times 5\times 3\times 3\times 3\times 3)(1575)}{2q} = \frac{(2\times 11\times 5\times 2\times 5\times 2)(1125)}{2r}$$

$$\frac{(2\times 2\times 5\times 3\times 3\times 3\times 3)(5\times 5\times 3\times 3\times 7)}{2q} =$$

$$\frac{(2\times 11\times 5\times 2\times 5\times 2)(5\times 5\times 5\times 3\times 3)}{2r}$$

$$\frac{3\times 3\times 3\times 3\times 7}{q} = \frac{11\times 5\times 2\times 5}{r}$$

$$\frac{567}{q} = \frac{550}{r}$$

The product of the remaining factors of ($N_{DTL}\,N_{DT}/i_D$), 5, 5, 2 and 11, equals 550 and is designated r. The product of the uncommon factors of N, 3, 3, 3, 3 and 7, equals 567 is designated q. N itself, 1620, is designated p. t=$N_{DTL}$=2200. s=$f_{sD}/f_v$=1237487, 2p=3240. n=2($N_T$)(p)=2(787.5)(1620)= 2551500. The control circuitry can be built for the first format by conforming the circuitry of FIGS. 6(a) and 6(b) with the above calculated variables. FIGS. 12(a) and 12(b) show such circuitry connected per the above calculated values.

Structuring the Converter Parameters for a Second Exemplary Proposed Format According to the First Embodiment A second exemplary proposed format has the following parameters:

a) $N_T$=525 total lines per frame b) $N_a$=483 active lines per frame c) $f_v$=59.94 fields per second d) i=1 field per frame Step #1, $N_{Da\ field}$=$N_{Da}/i_D$=1035 active lines per frame/2 fields per frame=517.5 active lines per field, $N_{a\ field}$=$N_a/i$ =483 active lines per field/1 field per frame=483 active lines per field.

Step #2. $B=N_{DL} N_{Da\ field}$=(1920 active luminance samples (bytes) per active line) (517.5 active lines per field)=993,600 active luminance samples (bytes) per field.

Step #3. $N_c=B/N_{a\ field}$=(993,600 active luminance samples (bytes) per field)/(483 active lines per field)= 2057.142857 active luminance samples (bytes) per active line.

Step #4. $N_c$ is not an integer. Decrement $N_{DL}$ by 1. $N_{DL}$=1919 active luminance samples (bytes) per line and $n_{dec}$=1. Go back to step #2.

Step #2. repeated. $B=N_{DL} N_{Da\ field}$=(1919 active luminance samples (bytes) per active line) (517.5 active lines per field)=993,082.5 active luminance samples (bytes) per field.

Step #3. repeated. $N_c=B/N_{a\ field}$=(993,082.5 active luminance samples (bytes) per field)/(483 active lines per field) =2056.071429 active luminance samples (bytes) per active line.

Step #4, repeated. $N_c$ is not an integer. Again decrement $N_{DL}$ by 1. $N_{DL}$=1918 active luminance samples (bytes) per active line and $n_{dec}$=2. Go back to step #2.

Step #2. repeated again. $B=N_{DL} N_{Da\ field}$=(1918 active luminance samples (bytes) per line)(517.5 active lines per field)=992,565 active luminance samples (bytes) per field.

Step #3, repeated again. $N_c=B/N_{a\ field}$=(992,565 active luminance samples (bytes) per field)/(483 active lines per field)=2055 active luminance samples (bytes) per active line. Therefore, $n_{dec}$=2 and there will be two dummy samples (bytes). $N_c$=2055 samples of a proposed format luminance (Y) line will be placed on the $N_{DL}$=1920 sample DVTR line by placing 1920 active luminance samples on a first DVTR line and 2055−1920=135 active luminance samples on a second DVTR line. The number of chrominance R-Y placed will be ½ $N_c$=1027 samples and chrominance B-Y will be also ½ $N_c$=1027 samples (one half a sample is dropped due to an odd $N_c$).

Step #5. $N=N_c/0.85$=(2055 active luminance samples (bytes) per active line)/0.85=2417.647059 active luminance samples (bytes) per active line.

Step #6. N=2418 active luminance samples (bytes) per line, rounded to the nearest integer.

Step #7. $N_{DTL}$=2200=2×2×2×5×5×11.

Step #8. N=2418=2×3×13×31.2418 factors poorly and has few common factors with $N_{DTL}$.

Step #9 increment and decrement N until the number of common factors of $N_{DTL}$ and N is greatest. Take the larger factors of 2200, like 11, 5 and 2. Look for numbers close to 2418 (but not 2200) that have factors with 11, 5, 5 and 2 in them. 550=11×5×5×2. 2200/550=4. 4+1=5. 11×5×5×2×5= 2750. Therefore, an N of 2750 would work. But, a number closer to 2418 is preferred. Look for numbers close to 2400 (but not 2200) that have factors with 2×2×2×5×5 in them. 200=2×2×2×5×5. 2200/200=11. 11−1=10=2×5. 2×2×2×5× 5×2×5=2000. 11+1=12=3×2×2. 2×2×2×5×5×3×2×2=2400. 2400 is very close to 2418. Therefore N=2400.

Step #10. $f_s$=N $N_T$ $f_v$=(2400 active samples (bytes) per line) (525 total lines per frame) (59.94 fields per second)= 75.52447552 MHz.

Step #11

$$\frac{N\ N_T}{qi} = \frac{N_{DTL}\ N_{DT}}{r\ i_D}$$

$$\frac{(2400)(525)}{q(1)} = \frac{(2200)(1125)}{r(2)}$$

$$\frac{(2\times2\times2\times5\times5\times3\times2\times2)(5\times5\times7\times3)}{q} =$$

$$\frac{(2\times11\times5\times2\times5\times2)(5\times5\times5\times3\times3)}{r(2)}$$

$$\frac{2\times2\times2\times7}{q} = \frac{11\times5}{r}$$

$$\frac{56}{q} = \frac{55}{r}$$

Figure 13A:
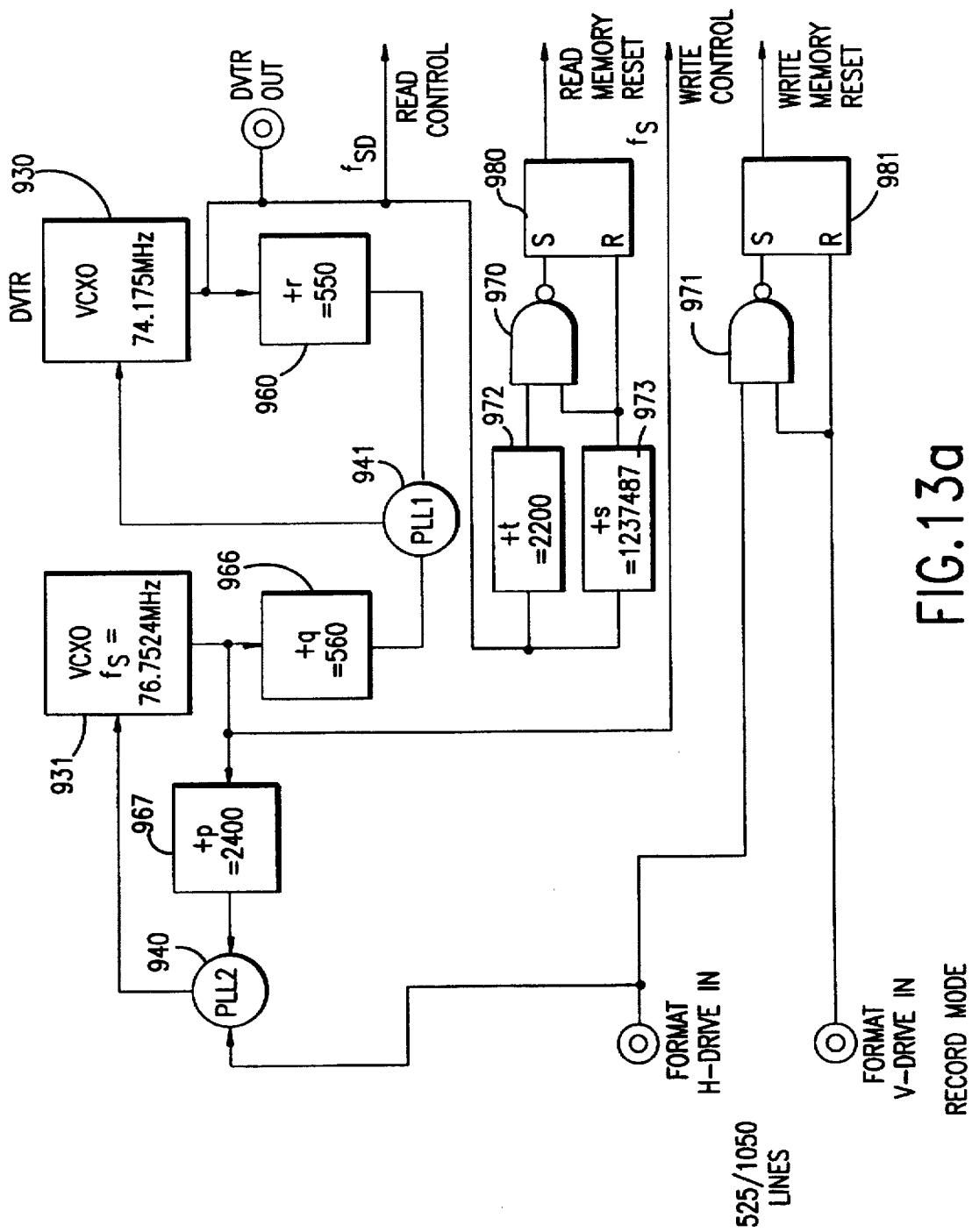
FIGS. 13(a) and (b) are respectively record mode and playback mode block schematic diagrams for clock and control oscillators for a second exemplary proposed format.
Figure 13B:
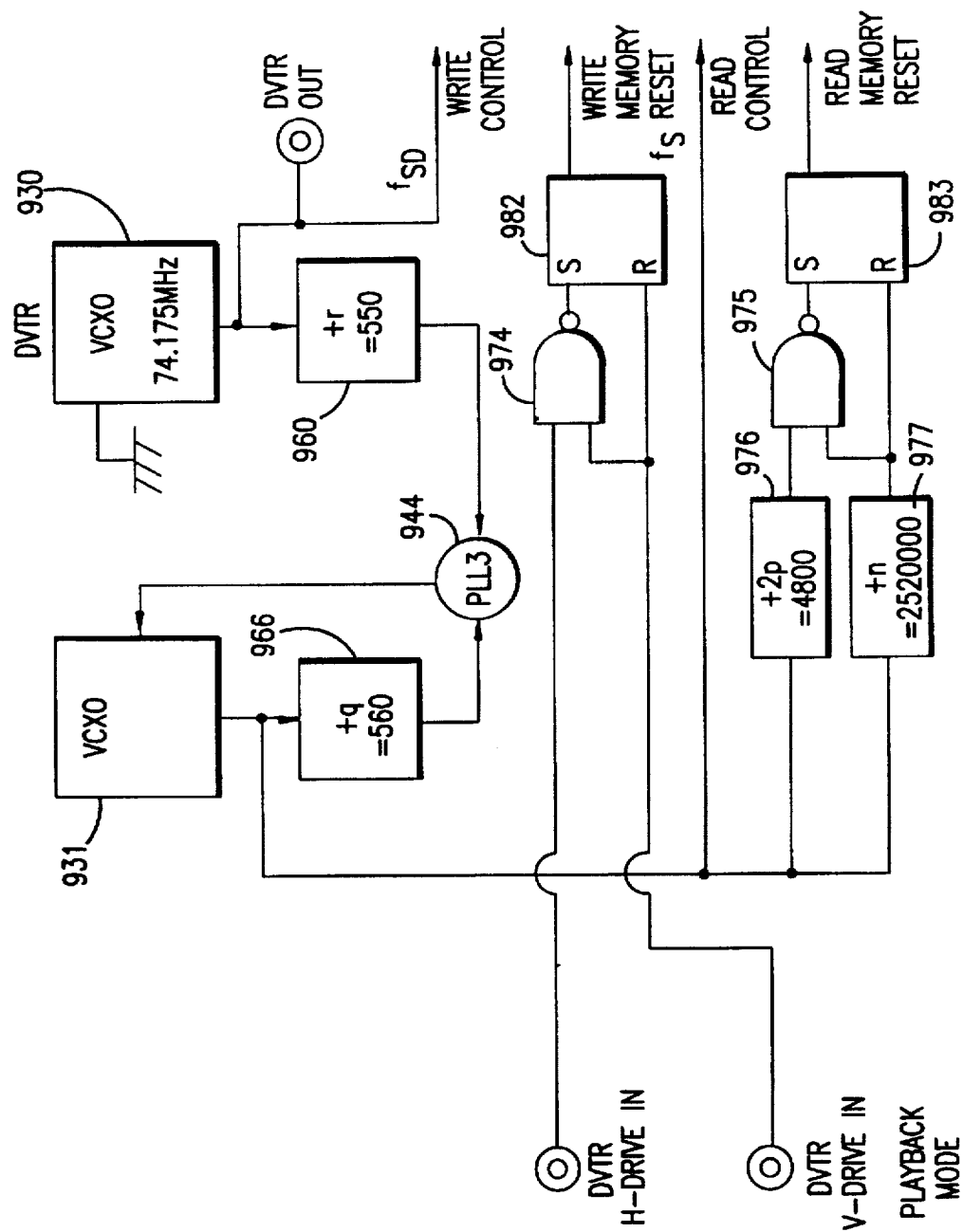

The product of the uncommon factors of ($N_{DTL}\ N_{DT}/i_D$), 11 and 5, equals 55 and is designated r. The product of the uncommon factors of (N $N_T/i$), 2, 2, 2 and 7, equals 56 and is designated q. N itself, 2400, is designated p. $t=N_{DTL}$= 2200, $s=f_{sD}/f_v$=1237487, 2p=4800, $n=2(N_T)(p)=2(525)$ (2400)=2520000. The control circuitry can be built for the second format by conforming the circuitry of FIGS. 6(a) and 6(b) per the above calculated values. FIGS. 13(a) and 13(b) show such circuitry connected as calculated above except that, to save costs in the preferred embodiment, the values of q and r have been multiplied by ten so that r=550 for both the first and the second exemplary proposed formats. Multiplying the values of q and r by ten, however, will decrease the frequencies compared at PLL1 941 and PLL3 944 thus decreasing the frequency control stability.

Structuring the Converter Parameters for a Second Exemplary Proposed Format According to the Second Embodiment Step #1. $N_{Da\ field}=N_{Da}/i_D$=1035 active lines per frame/2 fields per frame=517.5 active lines per field. $N_{a\ field}=N_a/i$= 483 active lines per field/1 field per frame=483 active lines per field.

Step 1A. $R=N_{Da\ field}/N_{a\ field}$=517.5/483=1.071428571.

Step #2. j/k=15/14. j=15 stored lines is a manageable number.

Step #3. $N_c$=(j/k) $N_{DL}$=(15/14) (1920 active luminance samples (bytes) per line)=2057.142857 active luminance samples (bytes) per line.

Step #4. $N_c$ is not an integer. 2057×(14/15)=1919.866667. 2056×(14/15)=1918.933333. 2055×(14/15)=1918. Therefore, $N_c$=2055 active luminance samples (bytes) per line and d=1920−1918=2 dummy samples per line.

Step #5. $N=N_c/085$=(1918 active luminance samples (bytes) per line)/0.85=2417.647059 active luminance samples (bytes) per line.

Step #6. N=2418 active samples (bytes) per line, rounded to the nearest integer.

Step #7. $N_{DTL}$=2200=2×2×2×5×5×11.

Step #8. N=2418=2×3×13×31. 2418 factors poorly and has few common factors with $N_{DTL}$.

Step #9 increment and decrement N until the number of common factors of $N_{DTL}$ and N is greatest. Take the larger factors of 2200, like 11, 5 and 2. Look for numbers close to 2418 (but not 2200) that have factors with 11, 5, 5 and 2 in them. 550=11×5×5×2. 2418/550=4.3966. 11×5×5×2×4= 2200. 11×5×5×2×5=2750. But, a number closer to 2418 is preferred. Also, if factors with 11, 5, 2 and 2 were tried instead, 220=11×5×2×2. 2418/220=10.9909. 11×5×2×2× 11=2420. We have few common factors with 11. Look for numbers close to 2418 (but not 2200) that have 2, 2, 2, 2, 2, 3 in them. 2×2×2×2×2×3=96. 2418/96=25.1875. 24=3×2× 2×2. 2×2×2×2×2×3×3×2×2×2×=2304. Try for a higher number of common factors. Up 24 to 25. 25=5×5. We need fives. 2×2×2×2×2×3×5×5=2400.

Step #10. $f_s$=N $N_T$ $f_v$=(2400 active samples (bytes) per line) (525 total lines per frame) (59.94 fields per second)= 75.52447552 MHz.

19

Step #11

$$\frac{N N_T}{q^i} = \frac{N_{DTL} N_{DT}}{r\, i_D}$$

$$\frac{(2400)(525)}{q(i)} = \frac{(2200)(1125)}{r(2)}$$

$$\frac{(2 \times 2 \times 2 \times 5 \times 5 \times 3 \times 2 \times 2)(5 \times 5 \times 7 \times 3)}{q} =$$

$$\frac{(2 \times 11 \times 5 \times 2 \times 5 \times 2)(5 \times 5 \times 5 \times 3 \times 3)}{r(2)}$$

$$\frac{2 \times 2 \times 2 \times 7}{q} = \frac{11 \times 5}{r}$$

$$\frac{56}{q} = \frac{55}{r}$$

The product of the common factors of ($N_{DTL}$ $N_{DT}/i_D$), 11 and 5, equals 55 and is designated r. The product of the uncommon factors of (N $N_T/i$), 2, 2, 2 and 7, equals 56 and is designated q. N itself, 2400, is designated p. t=$N_{DTL}$=2200, s=$f_{sD}/f_v$=1237487, 2p=4800, n=2($N_T$)(p)=2(525)(2400)=2520000. The control circuitry can be built for the second format by conforming the circuitry of FIGS. 6(a) and 6(b) per the above calculated values. FIGS. 13(a) and 13(b) show such circuitry connected as calculated above except that, to save costs in the preferred embodiment, the values of q and r have been multiplied by ten so that r=550 for both the first and the second exemplary proposed formats. Multiplying the values of q and r by ten, however, will decrease the frequencies compared at PLL1 941 and PLL3 944 thus decreasing frequency control stability.

Structuring the Converter Parameters for a Third Exemplary Proposed Format According to the First Embodiment A third exemplary proposed format has the following parameters:

a) $N_T$=900 total lines per frame b) $N_a$=828 active lines per frame c) $f_v$=59.94 fields per second d) i=1 field per frame Step #1. $N_{Da\ field}$=$N_{Da}/i_D$=1035 active lines per frame/2 fields per frame=517.5 active lines per field. $N_{a\ field}$=$N_a/i$=828 active lines per field/1 field per frame=828 active lines per field.

Step #2. B=$N_{DL}$ $N_{Da\ field}$=(1920 active luminance samples (bytes) per line) (517.5 active lines per field)=993,600 active luminance samples (bytes) per field.

Step #3. $N_c$=B/$N_{a\ field}$=(993,600 active luminance samples bytes per field)/(828 active lines per field)=1200 active luminance samples (bytes) per active line.

Step #4. $N_c$ is an integer, therefore $n_{dec}$=0 and there will be no dummy samples (bytes). $N_c$=1200 active luminance samples of a proposed format luminance (Y) line will be placed on a $N_{DL}$=1920 active luminance sample DVTR line. The number of chrominance R-Y placed will be ½ $N_c$=600 samples and chrominance B-Y will be also ½ $N_c$=600 samples.

Step #5. N=$N_c$/0.85=(1200 active luminance samples (bytes) per line)/0.85=1411.764706 active luminance samples (bytes) per line.

Step #6. N=1412 active luminance samples (bytes) per line, rounded to the nearest Integer.

Step #7. $N_{DTL}$=2200=2×2×2×5×5×11.

Step #8. N=1412=2×2×353. 1412 factors poorly and has few common factors with $N_{DTL}$.

Step #9 increment and decrement N until the number of common factors of $N_{DTL}$ and N is greatest. Take the larger factors of 2200, like 11, 5 and 2. Look for numbers close to 1412 (but not 2200) that have factors with 11, 5, 5 and 2 in them. 550=11×5×5×2. 2200/550=4. 4−1=3. 11×5×5×2×3=1650. Therefore, an N of 1650 would work. But, a number closer to 1412 is preferred. Also, if factors with 11, 5 and 5 were tried instead, 275=11×5×5, 2200/275=8, 8−1=7 (seven is not a lowest prime to settle at just yet), 8−2=6=3×2, 11×5×5×3×2=1650. If we used 8−3=5 then 11×5×5×5=1375 which would work better since it is very close to 1412. Therefore, N=1375 is used and in fact yields an $f_s$ equal to the DVTR clock, and thus oscillator 931, 932 is not needed for this format. This simplifies the circuitry and eliminates any jitter associated with two phase locked loops in cascade.

Step #10. $f_s$=N $N_T$ $f_v$=(1375 active luminance samples (bytes) per line) (900 total lines per frame) (59.94 fields per second)=74.17582418 MHz.

Step #11

$$\frac{N N_T}{q^i} = \frac{N_{DTL} N_{DT}}{r\, i_D}$$

$$\frac{(1375)(900)}{q(1)} = \frac{(2200)(1125)}{r(2)}$$

$$\frac{(11 \times 5 \times 5 \times 5)(3 \times 3 \times 5 \times 5 \times 2 \times 2)}{q} =$$

$$\frac{(2 \times 11 \times 5 \times 2 \times 5 \times 2)(5 \times 5 \times 5 \times 3 \times 3)}{r(2)}$$

$$\frac{1}{q} = \frac{1}{r}$$

Figure 14A:
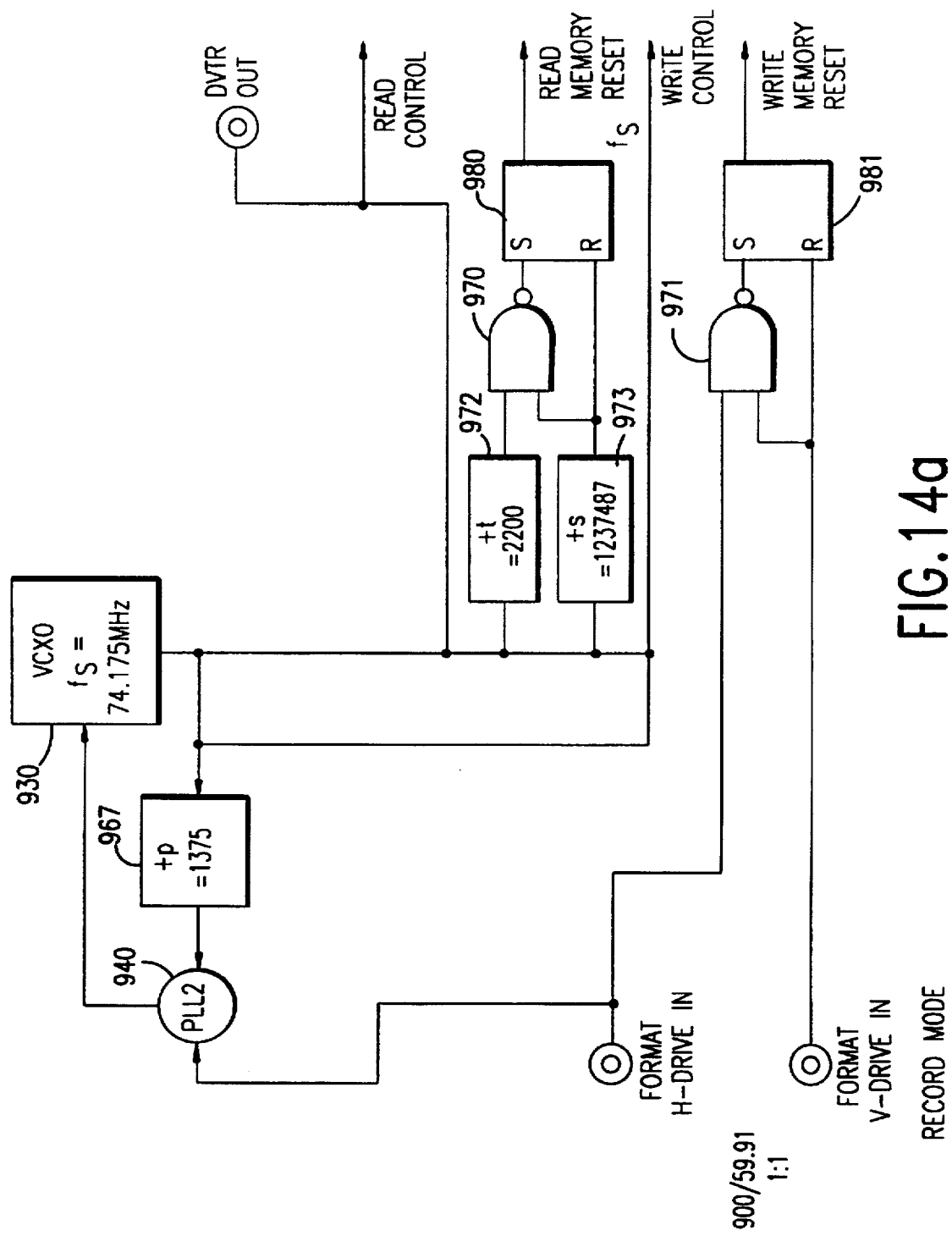
FIGS. 14(a) and (b) are respectively record mode and playback mode block schematic diagrams for a clock and control oscillator for a third exemplary proposed format.
Figure 14B:
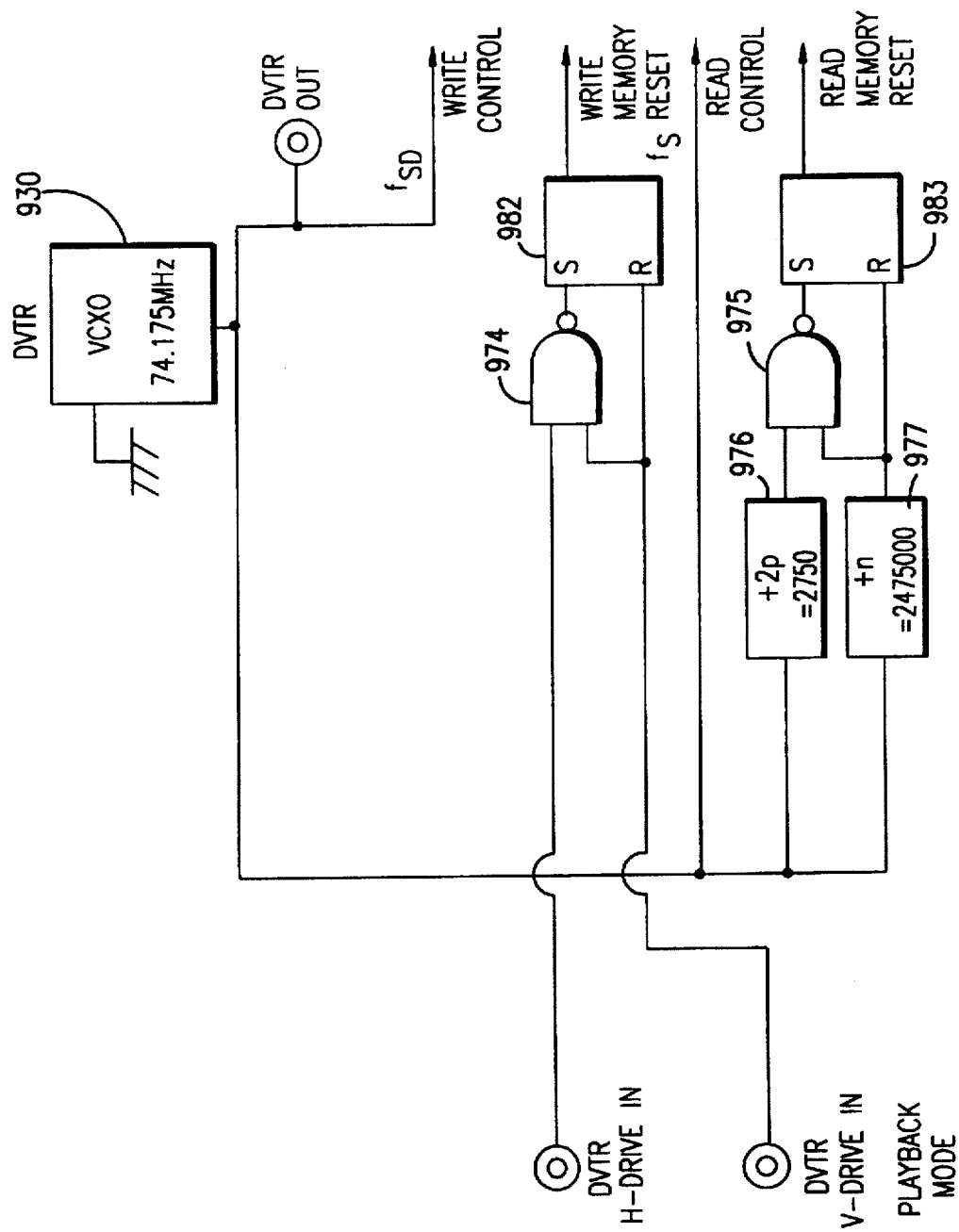

There are no remaining factors. Hense q=r=1 and $f_s$=74.17582418 MHz which is the same sampling frequency as the DVTR. Oscillators 930 and 931 can be the same oscillator. N itself, 1375, is designated p. t=$N_{DTL}$=2200, s=$f_{sD}/f_v$=1237487, 2p=2750, n=2($N_T$)(p)=2(900)(1375)=2475000. The control circuitry can be built for the second format by conforming the circuitry of FIGS. 6(a) and 6(b) per the above calculated values. FIGS. 14(a) and 14(b) show such circuitry connected as calculated above.

Structuring the Converter Parameters for a Third Exemplary Proposed Format According to the Second Embodiment Step #1. $N_{Da\ field}$=$N_{Da}/i_D$=1035 active lines per frame/2 fields per frame=517.5 active lines per field. $N_{a\ field}$=$N_a/i$=828 active lines per field/i field per frame=828 active lines per field.

Step 1A. R=$N_{Da\ field}/N_{a\ field}$=517.5/828=0.625.

Step #2. j/k 5/8. j=5 lines is a manageable number.

Step #3. $N_c$=(j/k) $N_{DL}$=(5/8)(1920 active luminance samples (bytes) per line)=1200 active luminance samples (bytes) per line.

Step #4. $N_c$ is an integer. Therefore, $N_c$=1200 active luminance samples (bytes) per line and d=0 dummy samples per line.

Step #5. N=$N_c$/0.85=(1200 active luminance samples (bytes) per line)/0.85=1411.764706 active luminance samples (bytes) per line.

Step #6. N=1412 active luminance samples (bytes) per line, rounded to the nearest integer.

Step #7. $N_{DTL}$=2200=2×2×2×5×5×11.

Step #8. N=1412=2×2×353. 1412 factors poorly and has few common factors with $N_{DTL}$.

Step #9 increment and decrement N until the number of common factors of $N_{DTL}$ and N is greatest. Take the larger factors of 2200, like 11, 5 and 2. Look for numbers close to 1412 (but not 2200) that have factors with 11, 5, 5 and 2 in them. 550=11×5×5×2. 2200/550=4. 4−1=3. 11×5×5×2×3=1650. Therefore, an N of 1650 would work. But, a number closer to 1412 is preferred. Also, if factors with 11, 5 and 5 were tried instead, 275=11×5×5, 2200/275=8, 8−1=7 (seven is not a lowest prime to settle at just yet). 8−2=6=3×2, 11×5×5×3×2=1650. If we used 8−3=5 then 11×5×5×5=1375 which would work better since it is very close to 1412. Therefore, N=1375 is used and in fact yields an $f_s$ equal to the DVTR clock, and thus oscillator 931, 932 is not needed for this format.

Step #10. $f_s$=N $N_T$ $f_v$=(1375 active samples (bytes) per line) (900 total lines per frame) (59.94 fields per second)= 74.17582418 MHz.

Step #11

$$\frac{N N_T}{qi} = \frac{N_{DTL} N_{DT}}{r i_D}$$

$$\frac{(1375)(900)}{q(1)} = \frac{(2200)(1125)}{r(2)}$$

$$\frac{(11 \times 5 \times 5 \times 5)(3 \times 3 \times \times 5 \times 5 \times 2 \times 2)}{q} =$$

$$\frac{(2 \times 11 \times 5 \times 2 \times 5 \times 2)(5 \times 5 \times 5 \times 3 \times 3)}{r(2)}$$

$$\frac{1}{q} = \frac{1}{r}$$

There are no remaining factors. Hense q=r=1 and $f_s$=74.17582418 MHz which is the same sampling frequency as the DVTR. Oscillators 930 and 931 can be the same oscillator. N itself, 1375, is designated p. t=$N_{DTL}$=2200, s=$f_{sD}$/$f_v$=1237487, 2p=2750, n=2($N_T$)(p)=2(900)(1375)= 2475000. The control circuitry can be built for the second format by conforming the circuitry of FIGS. 6(a) and 6(b) per the above calculated values. FIGS. 14(a) and 14(b) show such circuitry connected as calculated above.

The record mode and playback mode circuits of FIGS. 6(a) and 6(b) can be combined using switches to connect plural components (such as oscillators 931, 932, 933 or 934) according to the desired mode. Furthermore, the circuits of FIGS. 12(a) and 12(b) through 14(a) and 14(b) can be combined with switches to select a format to convert. Furthermore, the dividers can be programmable dividers to aid switching between formats. The above-mentioned switches and dividers can be substituted with a program controlled processor wherein proposed format data are entered, parameters are calculated by the above embodiment steps and clock and control signals are generated. It is also important to note that the record/playback circuitry of FIGS. 4 and 5 can share common components. For instance, it is preferred they share the same DVTR and controller. It is also preferred they share the same memories.

The above-described proposed HDTV formats are examples for teaching the present invention. These exemplary proposed formats are in no way preferred over each other or any other format. Using the principles taught by the above description, conversions for recording and playing back of any proposed format are possible. It will be recognized that modifications will occur to those of skill in the art. The present application is therefore intended to cover any such modifications which fall within the true spirit and scope of the present invention.

What is claimed is:

1. A high definition television signal format converter comprising:

an interface for adapting a high definition television signal format for digital storage;

a memory means for storing the adapted data via said interface;

a write circuit for addressing said memory means according to control signals;

a read circuit for addressing said memory means according to said control signals; and a control circuit for providing said control signals in accordance with a predetermined format conversion, said control circuit configurable to convert a first high definition television signal format to a second high definition television signal format compatible with a digital video recording apparatus, wherein said conversion from the first high definition television signal format to the second high definition television signal format is performed without interpolation or loss of picture information.

2. A high definition television signal format converter comprising:

a memory means for storing data input from a digital video recording apparatus;

a write circuit for addressing said memory means according to control signals;

a read circuit for addressing said memory means according to said control signals; and a control circuit for providing said control signals in accordance with a predetermined format conversion, said control circuit configurable to convert a first high definition television signal format compatible with a digital video recording apparatus to a second high definition television signal formats wherein said conversion from the first high definition television signal format to the second high definition television signal format is performed without interpolation or loss of picture information.

3. A method of recording a first high definition television format signal containing at least picture information on a digital video recording apparatus, the digital video recording apparatus being compatible with a second high definition television signal format and having a sample frequency signal, the method comprising:

generating a sampling clock signal;

digitizing the first high definition television format signal by sampling said first high definition television format signal at the sampling clock signal frequency;

storing the digitized first high definition television format signal in accordance with control signals;

reading the digitized first high definition television format signal in accordance with control signals such that a signal having the second high definition television format is produced; and recording on the digital video recording apparatus said signal having the second high definition television format, wherein all of the picture information within said digitized first high definition television format signal is recorded by said digital video recording apparatus without interpolation.

4. A method of recording a first high definition television signal format in accordance with claim 3, further comprising the step of synchronizing the sampling clock signal and the sample frequency signal.

5. A method of recording a first high definition television signal format in accordance with claim 4, where said step of synchronizing comprises producing a divided sampling clock signal from the sampling clock signal and a divided sample frequency signal from the sample frequency signal, whereby the frequency of the divided sampling clock signal and the frequency of the divided sample frequency signal are equal.

6. A method of recording a first high definition television signal format in accordance with claim 3, further comprising the step of storing dummy samples with the digitized first high definition television format signal.

7. A method of recording a first high definition television signal format in accordance with claim 6, wherein said dummy samples represent synchronizing data related to the first high definition television format signal.

8. A method of converting a first high definition television format signal containing at least picture information and being compatible with a digital video recording apparatus to a second high definition television format signal, the digital video recording apparatus having a sample frequency signal, the method comprising the steps of:

storing the first high definition television format signal in a memory in response to control signals; and reading the stored first high definition television format signal from the memory in response to said control signals so that the second high definition television format signal is produced, wherein all of the picture information within said first high definition television format signal is present without interpolation in said second high definition television format signal.

9. A method of converting a first high definition television format signal in accordance with claim 8, further comprising the step of producing an analog signal related to the second high definition television format signal.

10. A method of converting a first high definition television format signal in accordance with claim 8, further comprising:

generating a clock signal;

synchronizing the clock signal and the sample frequency signal of the digital video recording apparatus and generating a synchronizing signal; and generating said control signals in response to the clock signal and the synchronizing signal.

11. A method of converting a first high definition television format signal in accordance with claim 10, further comprising the step of producing an analog signal related to the second high definition television format signal.

12. A method of converting a first high definition television format signal in accordance with claim 10, wherein said synchronizing step further comprises producing a divided clock signal from the clock signal and producing a divided sample frequency signal from the sample frequency signal, whereby the frequency of the divided clock signal and the frequency of the divided sample frequency signal are equal.

13. A method of converting a first high definition television format signal in accordance with claim 8, further comprising step of detecting dummy samples contained within the stored first high definition television format signal and preventing the reading of the dummy samples when the second high definition television format signal is produced.

14. A method of converting a first high definition television signal in accordance with claim 13, where the dummy samples represent synchronizing information related to the second high definition television format signal.

15. A method of converting a first high definition television format signal in accordance with claim 10, further comprising step of detecting dummy samples contained within the stored first high definition television format signal and preventing the reading of the dummy samples when the second high definition television format signal is produced.

16. A method of converting a first high definition television signal in accordance with claim 15, where the dummy samples represent synchronizing information related to the second high definition television format signal.

17. A high definition television format signal converter for recording a first high definition television format signal containing at least picture information on a digital video recording apparatus, the digital video recording apparatus compatible with a second high definition television signal format and having a sample frequency signal, the converter comprising:

clock means for generating a sampling clock signal;

sampling means coupled to the clock means and responsive to the sampling clock signal for digitizing the first high definition television format signal;

memory means coupled to the sampling means for storing the digitized first high definition television format signal;

synchronizing means responsive to the sampling clock signal and the sample frequency signal for synchronizing the sampling clock signal and the sample frequency signal; and control means coupled to the memory means and responsive to the clock means and the synchronizing means for producing control signals, the control signals controlling the storing of the digitized first high definition television format signal in the memory means and controlling the reading of the digitized first high definition television format signal from the memory means such that a signal having the second high definition television format is produced, wherein all of the picture information within said first high definition television format signal is present without interpolation in said second high definition television format signal.

18. The high definition television format signal converter according to claim 17, wherein the memory means is a random access memory.

19. The high definition television format signal converter according to claim 17, wherein the memory means is a sequential address memory.

20. The high definition television format signal converter according to claim 17, wherein the synchronizing means includes a first divider means for producing a divided sampling clock signal from the sampling clock signal and a second divider means for producing a divided sample frequency signal from the sample frequency signal, whereby the frequency of the divided sampling clock signal and the frequency of the divided sample frequency signal are equal.

21. The high definition television format signal converter according to claim 19, wherein the synchronizing means includes a first divider means for producing a divided sampling clock signal from the sampling clock signal and a second divider means for producing a divided sample frequency signal from the sample frequency signal, whereby the frequency of the divided sampling clock signal and the frequency of the divided sample frequency signal are equal.

22. The high definition television format signal converter according to claim 20, wherein the first divider means divides the sampling clock signal by 56 and the second divider means divides the sample frequency signal by 55.

23. The high definition television format signal converter according to claim 21, wherein the first divider means divides the sampling clock signal by 56 and the second divider means divides the sample frequency signal by 55.

24. The high definition television format signal converter according to claim 17, further comprising dummy sample generating means coupled to the memory means and the control means for generating dummy samples for storing with the digitized first high definition television format signal.

25. The high definition television format signal converter according to claim 24, wherein the dummy samples represent synchronizing data related to the first high definition television format signal.

26. The high definition television format signal converter according to claim 19 further comprising dummy sample generating means coupled to the memory means and the control means for generating dummy samples for storing with the digitized first high definition television format signal.

27. The high definition television format signal converter according to claim 26, wherein the dummy samples represent synchronizing data related to the first high definition television format signal.

28. A high definition television format signal converter for converting a first high definition television format signal containing at least picture information and being compatible with a digital video recording apparatus to a second high definition television format signal, the digital video recording apparatus having a sample frequency signal, the converter comprising:

memory means coupled to the digital video recording apparatus for storing the first high definition television format signal;

clock means for generating a clock signal;

synchronizing means responsive to the clock signal and the sample frequency signal of the digital video recording apparatus for synchronizing the clock signal and the sample frequency signal; and control means coupled to the memory means and responsive to the clock means and the synchronizing means for producing control signals, the control signals controlling the storing of the first high definition television format signal in the memory means and controlling the reading of the stored first high definition television format signal such that the second high definition television format signal is produced when the stored first high definition television format signal is read, wherein all of the picture information within said first high definition television format signal is present without interpolation in said second high definition television format signal.

29. The high definition television format signal converter according to claim 28 further comprising digital-to-analog converter means coupled to the memory means for producing an analog signal related to the second high definition television format signal.

30. The high definition television format signal converter according to claim 28, wherein the memory means is a random access memory.

31. The high definition television format signal converter according to claim 28, wherein the memory means is a sequential address memory.

32. The high definition television format signal converter according to claim 28, wherein the synchronizing means includes a first divider means for producing a divided clock signal from the clock signal and a second divider means for producing a divided sample frequency signal from the sample frequency signal, whereby the frequency of the divided clock signal and the frequency of the divided sample frequency signal are equal.

33. The high definition television format signal converter according to claim 31, wherein the synchronizing means includes a first divider means for producing a divided clock signal from the clock signal and a second divider means for producing a divided sample frequency signal from the sample frequency signal, whereby the frequency of the divided clock signal and the frequency of the divided sample frequency signal are equal.

34. The high definition television format signal converter according to claim 32, wherein the first divider means divides the clock signal by 56 and the second divider means divides the sample frequency signal by 55.

35. The high definition television format signal converter according to claim 33, wherein the first divider means divides the clock signal by 56 and the second divider means divides the sample frequency signal by 55.

36. The high definition television format signal converter according to claim 28 further comprising dummy sample detection means coupled to the memory means for detecting dummy samples contained within the first high definition television format signal stored in the memory means and preventing the reading of the dummy samples when the second high definition television format signal is produced.

37. The high definition television format signal converter according to claim 36, wherein the dummy samples represent synchronizing data related to the second high definition television format signal.

* * * * *